US012737831B2

(12) United States Patent
Stepuch

(10) Patent No.: US 12,737,831 B2
(45) Date of Patent: Sep. 15, 2026

(54) GRAPHICS PROCESSING SYSTEMS

(71) Applicant: Arm Limited, Cambridge (GB)

(72) Inventor: Rafal Stepuch, Cambridge (GB)

(73) Assignee: Arm Limited, Cambridge (GB)

( * ) Notice: Subject to any disclaimer, the term of this patent is extended or adjusted under 35 U.S.C. 154(b) by 421 days.

(21) Appl. No.: 18/517,213

(22) Filed: Nov. 22, 2023

(65) Prior Publication Data

US 2024/0193720 A1 Jun. 13, 2024

(30) Foreign Application Priority Data

Dec. 12, 2022 (GB) .................................. 2218658.9

(51) Int. Cl.
*G06T 1/20* (2006.01)
*G06T 1/60* (2006.01)
*G06T 11/40* (2006.01)

(52) U.S. Cl.
CPC ................. *G06T 1/20* (2013.01); *G06T 1/60* (2013.01); *G06T 11/40* (2013.01)

(58) Field of Classification Search
USPC .......................................................... 345/619
See application file for complete search history.

(56) References Cited

U.S. PATENT DOCUMENTS 5,519,831 A * 5/1996 Holzhammer ...... G06F 11/1441 365/228
5,822,511 A * 10/1998 Kashyap ................ G06F 11/36 703/22
2007/0165035 A1* 7/2007 Duluk, Jr. ............... G06T 15/20 345/506
2010/0177105 A1* 7/2010 Nystad .................. G06T 15/005 345/553
2011/0057942 A1 3/2011 Mantor et al.
2014/0082120 A1* 3/2014 Ma ......................... G06F 15/16 709/213

(Continued)

FOREIGN PATENT DOCUMENTS

GB 2540227 A 1/2017

OTHER PUBLICATIONS

Search Report under Section 17, dated May 22, 2023, GB Patent Application No. 2218658.9.

*Primary Examiner* — James A Thompson
*Assistant Examiner* — Kim Thanh T Tran
(74) *Attorney, Agent, or Firm* — Pearl Cohen LLP

(57) ABSTRACT

A graphics processing system in which a render output is sub-divided into a plurality of tiles for rendering. The graphics processing system includes a memory system, a tiling circuit and a primitive list preparation circuit. The tiling circuit determines which primitives are to be rendered for regions into which the render output is sub-divided. The regions form a plurality of rows and columns of regions. The primitive list preparation circuit prepares and stores primitive lists for regions of the render output identifying the primitives that are to be rendered for the regions. The primitive list preparation circuit also stores a groups of pointers, each group pointing to respective primitive lists. The regions of the render output corresponding to the primitive lists that are pointed to by the pointers of the group of pointers comprise adjacent regions spanning a plurality of rows and a plurality of columns of regions.

20 Claims, 15 Drawing Sheets

(56) References Cited

U.S. PATENT DOCUMENTS

| | | | | |
|---|---|---|---|---|
| 2014/0139534 | A1* | 5/2014 | Tapply | G06T 11/40 345/522 |
| 2023/0038647 | A1* | 2/2023 | Agarwal | G06T 11/23 |
| 2023/0267569 | A1* | 8/2023 | Zhu | G06F 9/5066 345/501 |

* cited by examiner

130

131

| 0 | 4 | 8 | 12 | 16 | 20 | 24 | 28 | 32 | 36 | 40 | 44 |
|---|---|---|---|---|---|---|---|---|---|---|---|
| 1 | 5 | 9 | 13 | 17 | 21 | 25 | 29 | 33 | 37 | 41 | 45 |
| 2 | 6 | 10 | 14 | 18 | 22 | 26 | 30 | 34 | 38 | 42 | 46 |
| 3 | 7 | 11 | 15 | 19 | 23 | 27 | 31 | 35 | 39 | 43 | 47 |

| 0 | 1 | 8 | 9 | 16 | 17 | 24 | 25 | 32 | 33 | 40 | 41 |
|---|---|---|---|---|---|---|---|---|---|---|---|
| 2 | 3 | 10 | 11 | 18 | 19 | 26 | 27 | 34 | 35 | 42 | 43 |
| 4 | 5 | 12 | 13 | 20 | 21 | 28 | 29 | 36 | 37 | 44 | 45 |
| 6 | 7 | 14 | 15 | 22 | 23 | 30 | 31 | 38 | 39 | 46 | 47 |

FIG. 15

GRAPHICS PROCESSING SYSTEMS

BACKGROUND

The technology described herein relates to graphics processing systems, and in particular to methods and systems for use when processing graphics primitives in graphics processing systems in which a render output is sub-divided into a plurality of tiles for rendering (e.g. so-called "tile based" graphics processing systems).

Graphics processing is normally carried out by first splitting the scene to be displayed into a number of similar basic components or "primitives", which primitives are then subjected to the desired graphics processing operations. The graphics "primitives" are usually in the form of simple polygons, such as triangles.

Each primitive is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates, in order to generate the desired render output of the graphics processing system.

Once primitives and their vertices have been generated and defined, they may be processed by the graphics processing system, in order, e.g., to display the frame. This processing basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

Some graphics processing systems use so called "tile based" rendering. In tile based rendering, rather than the entire render output (e.g. frame to be displayed) effectively being processed in one go, the render output is divided into a plurality of smaller sub regions, usually referred to as "tiles". Each tile (sub region) is rendered separately, and the rendered tiles (sub regions) are then recombined to provide the complete render output, e.g., frame for display. In such arrangements, the render output is typically divided (by area) into regularly sized and shaped rendering tiles (they are usually rectangles, e.g. squares).

(Other terms that are commonly used for "tiling" and "tile based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.)

In order to facilitate this, lists of the primitives to be rendered for each tile (e.g. that will appear in the tile) are prepared. Such a "tile-list" (which is also often referred to as a "primitive list" or "polygon list") identifies, e.g. by reference to a primitive indicator, the primitives to be rendered for a tile in question. The process of preparing tile-lists for tiles to be rendered is usually carried out by determining (at a desired level of accuracy) the primitives that intersect (i.e. that will appear (at least in part) within) a tile in question, and then preparing a list of those primitives for future use by the graphics processing system.

It should be noted here that where a primitive falls into more than one tile, as will frequently be the case, it may be included in a tile-list for each tile that it falls within.

In effect, a tile can be considered to have a bin (the tile-list) into which any primitive that should be processed for the tile is placed (and, indeed, the process of sorting the primitives on a tile basis in this manner is commonly referred to as "binning").

The tile-lists prepared in this way can then be written out, e.g. to memory. Once a first processing pass including the tiling operation is complete, such that all of the tile-lists (for all of the primitives for all of tiles) have been prepared, the tile-lists can then be used by the graphics processor, e.g. in a second (deferred) processing pass, to perform the actual rastering and rendering of the rendering tiles. The information stored in the tile-lists is used to identify the primitives to be rastered and rendered for each rendering tile when generating the desired render output, e.g. to display the frame.

The Applicants believe, however, that there remains scope for improvements in how data is arranged and stored in such tile-lists for use by tile-based rendering systems.

BRIEF DESCRIPTION OF THE DRAWINGS

Various embodiments of the technology described herein will now be described by way of example only and with reference to the accompanying drawings, in which:

FIG. **5*a* shows an arrangement of primitive list pointers according to the technology described herein

FIG. **6*a* shows an arrangement of primitive list pointers

FIGS. 14, 15 and 16 show arrangements of primitive list pointers according to the technology described herein.

DETAILED DESCRIPTION

Figure 1:
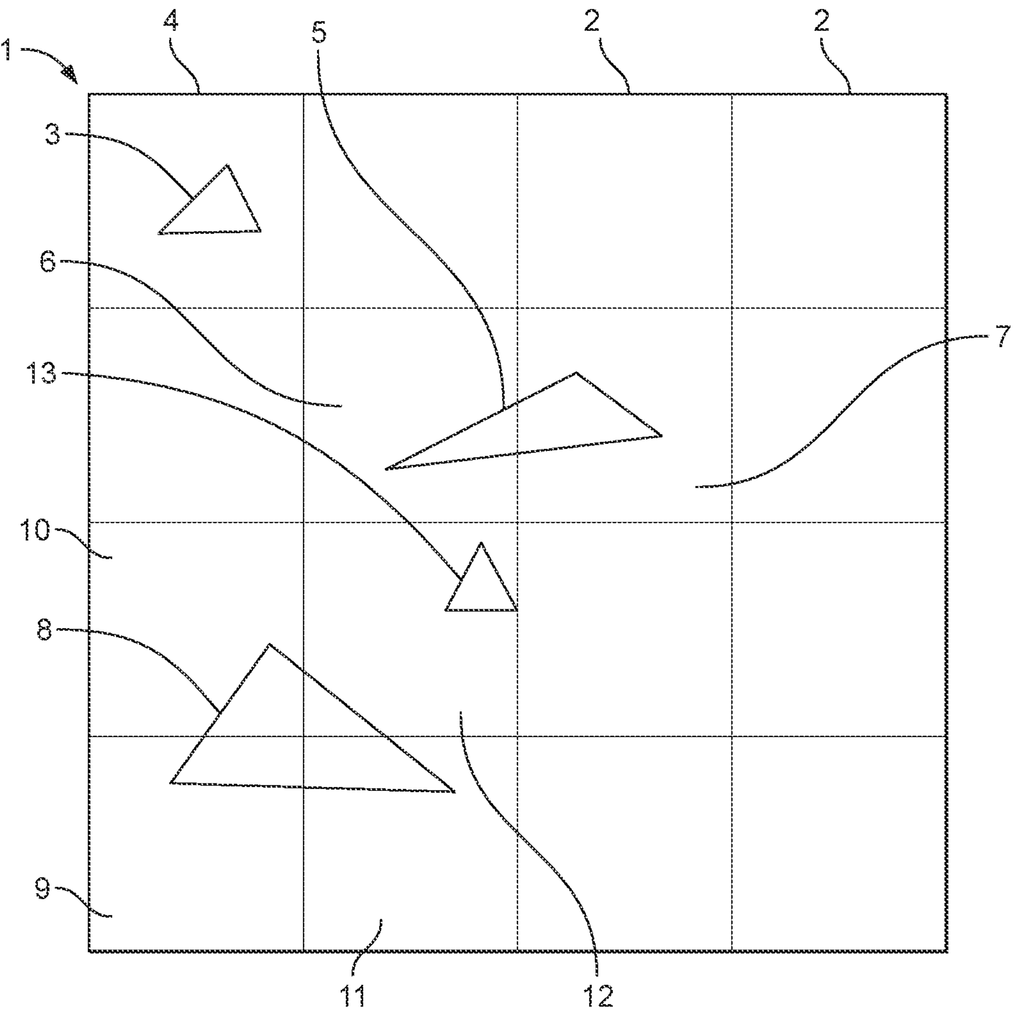
FIG. 1 shows schematically a tile-based graphics processing arrangement.

An embodiment of the technology described herein comprises a method of processing data in a graphics processing system in which a render output is sub-divided into a plurality of tiles for rendering, the method comprising:

determining which primitives in a sequence of primitives to be processed for the render output are to be rendered for respective regions into which the render output is sub-divided for sorting the primitives, wherein the regions form a plurality of rows and columns of regions;

preparing corresponding primitive lists for respective regions of the render output, each primitive list identifying a respective list of primitives that are to be rendered for the region of the render output to which the primitive list relates;

storing the primitive lists in a first region of a memory system of the graphics processing system;

for each of one or more groups of pointers, each group of pointers comprising a plurality of pointers that point to respective primitive lists:

storing the group of pointers in a second region of the memory system;

wherein the regions of the render output corresponding to the primitive lists that are pointed to by the pointers of the group of pointers comprise adjacent regions spanning a plurality of rows and a plurality of columns of regions.

Another embodiment of the technology described herein comprises a graphics processing system in which a render output is sub-divided into a plurality of tiles for rendering, the graphics processing system comprising:

a memory system;

a tiling circuit that is operable to perform tiling operations to determine which primitives in a sequence of primitives to be processed for the render output are to be rendered for respective regions into which the render output is sub-divided for sorting the primitives, wherein the regions form a plurality of rows and columns of regions; and a primitive list preparation circuit that is operable to:

prepare corresponding primitive lists for respective regions of the render output, each primitive list identifying a respective list of primitives that are to be rendered for the region of the render output to which the primitive list relates;

store the primitive lists in a first region of a memory system of the graphics processing system; and for each of one or more groups of pointers, each group of pointers comprising a plurality of pointers that point to respective primitive lists:

store the group of pointers in a second region of the memory system;

wherein the regions of the render output corresponding to the primitive lists that are pointed to by the pointers of the group of pointers comprise adjacent regions spanning a plurality of rows and a plurality of columns of regions.

The technology described herein relates to so-called "tile-based" graphics processing systems in which a render output (e.g. a frame for display) is sub-divided into a plurality of (smaller) regions ("tiles") for rendering, each region including a respective area of the render output. The respective regions (tiles) into which the render output is sub-divided for rendering may then be rendered separately, e.g. in parallel.

The graphics processing system is configured, e.g. in a first processing pass, to perform a "tiling" operation that effectively sorts the geometry (which in the technology described herein is defined in terms of graphics "primitives") that is defined for the render output into respective different regions of the render output (into which the render output is sub-divided for the purpose of sorting the primitives). The regions are arranged into a plurality of rows and a plurality of columns of regions, e.g. an array of regions, of (i.e. that cover) the render output.

The tiling operation thus determines which primitives in a sequence of primitives that are to be processed for a render output need to be rendered for which of the regions.

The result of this tiling operation is to generate a corresponding set of primitive lists (which are sometimes also referred to as "tile-lists", or "polygon lists", but the term "primitive lists" will primarily be used herein) that identify which of the primitives in the sequence of primitives defined for the render output are to be rendered for respective different regions of the render output. In this respect, it should be noted that a given primitive list may be prepared either for a single tile or for plural tiles of the render output.

In other words, the regions into which the render output is divided for the tiling purpose may or may not directly correspond to the regions (i.e. "tiles") into which the render output is divided for rendering. Likewise, a given rendering tile may be associated with more than one primitive list (e.g. where the tiling operation is performed in a hierarchical manner), in which case multiple primitive lists may need to be suitably merged in order to determine which primitives are to be rendered for the region, and in which order. Various examples are possible in this regard, e.g. depending on how the render output is divided for processing.

(In embodiments, the (e.g. graphics processor of the) graphics processing system then performs the actual rendering of the regions making up the overall render output in a second, "deferred" processing pass in which the primitives to be rendered for the different regions are identified using the respective primitive lists that were prepared in the first processing pass. Thus, once all of the primitive lists have been prepared, and the primitives sorted into the different regions of the render output accordingly, the primitive lists may then be read back into the graphics processor and used to perform the rendering of the respective rendering tiles to generate the render output.)

The technology described herein particularly relates to how the primitives lists are arranged and stored. Once the primitive lists have been prepared, they are stored in (written out to) a (first) region of the memory system. A plurality of pointers that point to the (respective) primitive lists are (e.g. prepared and) stored in (written out to) a (second) region of the memory system, i.e. the pointers are stored in a different region of the memory system from the primitive lists to which the respective pointers point.

The plurality of pointers are grouped into and stored in one or more groups of pointers. The pointers in a group of pointers point to respective primitive lists that correspond to adjacent regions of the render output, i.e. regions that border each other. The adjacent regions span a plurality of rows and a plurality of columns.

Thus a group of pointers, which is stored (e.g. together) in the second region of the memory system, corresponds to a block of adjacent regions in the render output that spans multiple rows and columns.

Storing groups of pointers in this way helps to arrange a group of pointers together (e.g. close to each other) in the memory system (such as in a cache line) that corresponds to a group of regions that are close to each other in the render output (e.g. close to each other in screen space). Thus, when groups of primitives that are close to each other (e.g. spanning a group of regions) in the render output are to be processed to perform the rendering, the pointers that need to be read from the memory system (to fetch the corresponding primitive lists) have a greater chance of being closer together in the memory system.

This may work particularly well when the graphics processing system comprises a cache system, in which the pointers may be stored (e.g. temporarily), such that the cache system may already contain a pointer to a primitive list when a region of the render output is being rendered (owing to a neighbouring region having been processed and already fetched the group of pointers into the cache).

This contrasts with storing pointers to primitive lists in memory in a simple linear fashion, e.g. in which the pointers are written out row by row for the regions (e.g. tiles) of the render output. Storing the pointers in a linear manner means that, when a primitive spans two (or more) rows of regions being rendered, it is likely (depending on the size of the render output and the regions into which it is sub-divided) that this will require multiple different groups of pointers to the primitive lists to be read (e.g. when the regions on one row correspond to a different group of pointers from the regions on the next row). This is not an efficient use of memory transactions.

However, for the technology described herein, the arrangement of the pointers is such that, for a primitive spanning two (or more) rows (and, e.g., columns) of regions being rendered, it is more likely that the pointers to the required primitive lists will be part of the same group of primitives. This helps to reduce the number of memory reads.

In embodiments, the method comprises (and the tiling circuit is operable to) sub-dividing the render output into a plurality of regions for sorting the primitives.

The render output may be sub-divided into the regions in any suitable and desired way. In one embodiment the render output is sub-divided into the regions in only a single way, e.g. with all of the regions having the same size and shape. In one embodiment the render output is sub-divided into the regions in a plurality of different ways. This may be used to form different sets (e.g. levels) of regions of the render output, e.g. forming a hierarchy of levels of regions.

Thus, for example, multiple different regions (e.g. having different sizes and/or shapes, e.g. in different levels) may cover the same area of the render output. In one embodiment (e.g. when the render output is sub-divided into rectangular regions), the regions into which the render output is sub-divided in one level correspond to a plurality of regions into which the render output is sub-divided in a different level.

For example, two or four regions in one level may correspond to a single region in another level. Thus, for example, the render output may be sub-divided into 16×16 (pixels) regions in one level and 32×32 (pixels) regions in another level, and one 32×32 region may correspond to four 16×16 regions (that cover the same area of the render output).

In embodiments, the method comprises (and the tiling circuit is operable to) sub-dividing the render output into a plurality of regions (each) of a first size for sorting the primitives (i.e. a first level of regions); and sub-dividing the (same area of the) render output into a plurality of regions (each) of a second size for sorting the primitives (i.e. a second level of regions); wherein the plurality of regions of a second size each correspond to a plurality of the regions of a first size, i.e. the second size of regions are larger than (e.g. integer multiples of) the first size of regions.

When the render output is sub-divided (in plural different ways) into regions in plural levels of regions (of different shapes and/or sizes), in embodiments, the method is (and the various circuits of the graphics processing system are operable to) repeated for each of the plural levels of regions.

Thus, in embodiments, the method comprises (and the tiling circuit is operable to) determining which primitives in a sequence of primitives to be processed for the render output are to be rendered for respective regions into which the render output is sub-divided for sorting the primitives (for each of the plural levels of regions, i.e. for each of the regions of a first size and each of the regions of a second size).

In embodiments, the method comprises (and the primitive list preparation circuit is operable to) preparing corresponding primitive lists for respective regions of the render output (for each of the plural levels of regions, i.e. for each of the regions of a first size and each of the regions of a second size), each primitive list identifying a respective list of primitives that are to be rendered for the region of the render output to which the primitive list relates; and storing the primitive lists in a first region of a memory system of the graphics processing system.

The pointers to the primitive lists for the regions of the first size and the pointers to the primitive lists for the regions of the second size may be stored in the memory system in any suitable and desired way. In some embodiments, the pointers to the primitive lists for the regions of the first size are stored as one group of pointers and the pointers to the primitive lists for the regions of the second size as a separate group of pointers. Thus, for example, one or more groups of regions may (each) comprise a plurality of regions of the first size and one or more other groups of regions may (each) comprise a plurality of regions of the second size.

In these embodiments, the group of pointers to the primitive lists for the regions of the second size may include pointers corresponding to regions of the second size that do not necessarily correspond to (the same area of the render output as) the regions of the first size. Instead, for example, the group of pointers may include a particular (e.g. predefined) number of pointers, e.g. to fill a block (such as a cache line) in the second region of the memory system. This may, for example, be the same number of pointers as in the group of pointers to the primitive lists for the regions of the first size.

In some embodiments the group of pointers that are stored (e.g. together) in the second region of the memory system comprises the pointers to the primitive lists for the plurality of adjacent regions of the first size and the pointers to the primitive lists for the region(s) of the second size (e.g. that correspond to (the same area of the render output as) the multiple adjacent regions of the first size). Thus the (e.g. each) group of regions may comprise a plurality of regions of the first size and one or more regions of the second size.

Thus, in some embodiments, the method comprises (and the primitive list preparation circuit is operable to), for each of one or more groups of pointers, each group of pointers comprising a plurality of pointers that point to respective primitive lists:

- storing the group of pointers in a second region of the memory system;
- wherein the regions of the render output corresponding to the primitive lists that are pointed to by the pointers of the group of pointers comprise:
  - a plurality of adjacent regions of a first size spanning a plurality of rows and a plurality of columns of regions; and
  - one or more regions of a second size each corresponding to a set of plural adjacent regions of the plurality of adjacent regions of a first size.

In some embodiments, the group of regions comprises the regions in each of the plural levels of regions (for the regions in the different levels that correspond to each other, e.g. for a particular area of the render output).

Once the primitive lists have been prepared, they are stored in a first region of the memory system. The first region may be any suitable and desired part of the memory system. In one set of embodiments the memory system comprises a (e.g. main) memory and the first region comprises (e.g. a region of) the (main) memory.

One or more groups of pointers are stored in a second region of the memory system. In embodiments, the method comprises the step of (and the primitive list preparation circuit is operable to), for each group of pointers, preparing the plurality of pointers to point to the respective primitive lists.

Each group of pointers includes a plurality of pointers that point to a respective plurality of primitive lists (for respective regions of the render output). Thus, each pointer corresponds to a primitive list for a region into which the render output was sub-divided for sorting the primitives.

Likewise, each pointer corresponds to a region into which the render output was sub-divided for sorting the primitives, and thus each group of pointers corresponds to a respective group of regions of the render output. The regions comprise adjacent (i.e. neighbouring) regions in the render output that span a plurality of rows of regions and a plurality of columns of regions, i.e. a two-dimensional area of the render output.

Thus the group of regions spans at least two rows and two columns of regions in the render output, such that at least one region of the group has adjacent regions in the group in both the adjacent column and the adjacent region, i.e. neighbours in both x and y in the array of regions. In embodiments, the group of regions comprises (at least) a 2×2 block of adjacent regions.

The regions (of a group of regions), corresponding to the primitive lists that are pointed to by the group of pointers, may be arranged (in the render output) in any suitable and desired way. In one set of embodiments the regions (of a group of regions) comprise a rectangular array of regions, i.e. spanning a plurality of rows and a plurality of columns of regions. For example, the rectangular array could comprise a 2×2 array (i.e. spanning two rows and two columns), a 2×3 array (i.e. spanning two rows and three columns), a 2×4 array, a 4×2 array, etc.

In one set of embodiments the regions (of a group of regions) comprise an irregular (e.g. non-rectangular) shape for the group of regions spanning the render output. For example, in addition to a rectangular array, the group of regions may comprise one or more additional regions adjacent the rectangular array, e.g. in an adjacent row or column of regions.

Thus, the group of regions may comprise a plurality of (adjacent) rows of regions, wherein one or more of the rows spans a different number of (adjacent) columns from the number of (adjacent) columns in one or more of the other rows, e.g. one row may span four columns and two other rows may span two columns. Similarly, the group of regions may comprise a plurality of (adjacent) columns of regions, wherein one or more of the columns spans a different number of (adjacent) rows from the number of (adjacent) rows in one or more of the other rows.

A group of regions may be formed from any suitable and desired number of regions. For example, the number of regions in a group of regions may depend on the data size of the group of pointers to be stored, e.g. equivalent to a cache line. In one set of embodiments each group (e.g. of a plurality) of the groups of regions is formed from between four and twelve regions, e.g. between six and ten regions, e.g. eight regions.

When the render output is sub-divided into regions in different levels of a hierarchy, the (e.g. each) group of regions may comprise regions from more than one level, e.g. such that the total number of regions from the different levels in a (e.g. each) group is equal to the total number of pointers in the corresponding group of pointers that are able to be stored in the block of data (e.g. cache line) that is allocated in the second region of the memory system.

The data size (and thus the information stored) for each pointer may be set based on the data size available (e.g. in a cache line) for storing the group of pointers in the second region of the memory system.

When there are a plurality of groups of pointers (such that there are a corresponding plurality of groups of regions of the render output), in embodiments, the groups of regions (e.g. within a hierarchy level) tessellate, e.g. in a regular pattern, with each other over the render output. In one set of embodiments each group (e.g. of a plurality) of the groups of regions forms the same shape and, e.g., these groups tessellate with each other. It will be appreciated, depending on the shape of each region, that the groups of regions may not be oriented in the same way but, for example, some groups may be a rotation and/or a reflection of other groups. This may facilitate their tessellation.

In one set of embodiments groups (e.g. of a plurality) of the groups of regions (e.g. within a hierarchy level) form two different shapes and, e.g., these groups tessellate with each other. Thus, at least one group of regions may form one shape and at least another group of regions may form a different shape.

In embodiments, one or more (e.g. each) group (e.g. of a plurality) of the groups of regions forms a contiguous block of regions (e.g. within a hierarchy level) in the render output. Thus, in embodiments, in a (e.g. each) group of regions (e.g. within a hierarchy level), there are no regions (or sets of regions) that are non-contiguous with the other regions of the group of regions.

In embodiments, (e.g. each of) the groups of regions are arranged such that the regions of a group of regions (e.g. within a hierarchy level) do not extend from the end of one row (or rows) of regions to the beginning of another (e.g. the next) row (or rows) of regions (in a sequence of contiguous rows of regions), e.g. the regions of a group of regions (e.g. within a hierarchy level) are confined to a set of rows. Preventing the regions in a group from wrapping round in this way helps to keep the regions in a group localised to each other in the render output.

The groups of regions may be arranged in any suitable and desired way to form contiguous blocks of regions, e.g. depending on the size and shape of the render output and/or the size and shape of the regions (and the groups of regions). In one embodiment the (e.g. tessellating) groups of regions (e.g. within a hierarchy level) are arranged in a repeating (e.g. tessellating) pattern over the render output, e.g. from left to right across the columns of the render output.

In some embodiments, the number of columns (across the width) of the render output (e.g. within a hierarchy level) may be an integer multiple of the number of columns (across the width) of a group of regions (e.g. when all of the regions have the same width). For example, each group (e.g. of a plurality) of the groups of regions may have a width of two or four columns of regions. However, this may not always be (and in some embodiments is not) the case.

In one set of embodiments, the groups of regions are arranged such that, when a group of regions (e.g. within a hierarchy level) occupies the final (e.g. rightmost) column of the render output, no more regions are associated with that group of regions (thus, in some cases, forming a smaller (e.g. incomplete) group of regions than other groups of regions, but preventing the group of regions from wrapping round to the beginning of another row of regions (in a non-contiguous column)). This may, for example, be when the groups of regions tessellate over the render output but that the render output is not able to be divided equally into an integer number of groups of regions.

Thus, in some embodiments, the size and shape of the groups of regions may not all be the same, e.g. when wrapping is prevented such that some of the groups (e.g. at the end of a row or rows) are smaller. This may depend on the size and shape of the render output and/or the size and shape of the regions (and the groups of regions)).

The group of pointers is stored in a second region of the memory system. The second region may be any suitable and desired part of the memory system. In one set of embodiments the memory system comprises a cache system and the second region comprises (e.g. a region of) the cache system. In embodiments, the cache system is between the graphics processor (of the graphics processing system) and the (e.g. main) memory of the memory system.

The group of pointers may be stored (and the method may comprise storing the group of pointers) in the (e.g. main) memory of the memory system, e.g. as well as being stored in the cache system. When the group of pointers is stored in the cache system, any suitable and desired write policy (e.g. write-through or write-back) may be used to also store the group of pointers in the (e.g. main) memory of the memory system.

In embodiments, the group of pointers is stored (i.e. written out) in the same block (e.g. cache line) of data. This helps to make it easier to fetch the primitive lists for the group of regions corresponding to the group of pointers, e.g. when reading the group of pointers from the cache or fetching the group of pointers from the (e.g. main) memory of the memory system.

In one set of embodiments the group of pointers is stored in a block (e.g. cache line) of data that corresponds to a single memory read. This helps when reading the group of pointers, e.g. into the cache.

For example, a group of (e.g. eight or ten) pointers may be stored in the same block (e.g. cache line) of data, e.g. corresponding to a single memory read. A cache line may, for example, comprise a block of 512 bits of data. A pointer may, for example, comprise 48 or 64 bits of data. Thus, a cache line may contain other data, in addition to the pointers, or it may be possible to store additional pointers (e.g. from other levels in the hierarchy) in the cache line.

In some embodiments the block of data for the group of pointers is stored in a plurality of cache lines in the second region of the memory system. This may allow a larger group of pointers (corresponding to a larger group of regions) to be stored together. The block of data allocated to store the group of pointers may thus have a larger size, e.g. 1024 bits or higher.

In embodiments, the group of pointers is stored (e.g. written out) together, e.g. at the same time, e.g. in the same memory (or cache) write operation. Similarly, when the pointers are retrieved, in embodiments, the group of pointers is retrieved (e.g. read in, e.g. to the cache) together, e.g. at the same time, e.g. in the same memory (or cache) read operation.

When the render output is sub-divided into regions in plural levels of regions, in one set of embodiments the group of pointers that is stored comprises the pointers to the primitive lists for the region(s) in each level of regions in the hierarchy (e.g. for regions in different levels that correspond to each other). This helps to group all of the pointers for a particular area of the render output (even across the plural levels of regions) in the same region of memory.

This is in contrast with linear storing techniques in which pointers for different (e.g. second and above) levels of a hierarchy may be stored after all of the pointers for a particular (e.g. first) level have been stored, which places the pointers for different levels of the hierarchy far apart in memory, even when the pointers correspond to regions (e.g. in different levels of the hierarchy) that are in the same area of the render output (and thus may be covered by the same primitives).

In one set of embodiments, the pointers for the region(s) of the second (larger) size are stored in the group of pointers with (e.g. after) the pointers for the regions of the first (smaller) size). In one example, the group of pointers comprises eight pointers corresponding to eight respective (e.g. 16×16) regions of the render output in a first level and two pointers corresponding to two respective (e.g. 32×32) regions of the render output in a second level, each of the two regions in the second level corresponding to (covering the same area of the render output as) four respective regions in the first level). Thus the ten pointers may be stored together (e.g. a single cache line).

When the group of pointers is stored in a larger block of data, e.g. in multiple cache lines, a larger number of pointers from the different levels of the hierarchy may be stored together, e.g. sixteen pointers corresponding to respective regions in a first level and four pointers corresponding to respective regions in a second level.

When the group of pointers is stored in the same block of data in the second region of memory, any suitable and desired data may be stored in the block. For example, the block of data may only (solely) contain the group of pointers. The pointers may comprise a head pointer to the start of the (e.g. each) primitive list. The pointers may comprise a tail pointer to the end of the (e.g. each) primitive list.

In one set of embodiments the block of data contains further data fields, e.g. in addition to the group of pointers. Thus the method may comprise (and the primitive list preparation circuit may be operable to) storing further data fields with the group of pointers in the second region of the memory system (e.g. for each of the one or more groups of pointers).

The further data fields may comprise any suitable and desired pieces of data, e.g. for use or that are associated with the group of pointers, the primitive lists, the primitives and/or the render output. For example, compression data or state commands (e.g. per primitive or primitive list) may be stored in the block of data. This data may be associated with a particular area of the render output and so it may conveniently be stored alongside the pointers for the corresponding region, e.g. using the same cache tags as for the group of pointers.

In one embodiment, metadata associated with a primitive list (or group of primitive lists) may be stored in the block of data. In one embodiment, one or more compression or state tracking properties (e.g. per primitive or primitive list) may be stored in the block of data.

An example of a state tracking property is the variable rate shading (VRS) rate. The VRS rate (e.g. per region or per primitive) for a primitive list may be stored in the block of data. However, in one embodiment the VRS rate may be stored selectively, e.g. only when the VRS rate changes. This helps to minimise the data that is stored.

Such data (e.g. metadata, compression, state tracking properties) is convenient to store with the group of pointers for a group of primitive lists, as they may also be associated with a primitive, primitive list and/or region (e.g. tile), and thus the same (e.g. cache) tag (e.g. related to a memory address) may be appropriate for both the (e.g. group of) pointers and the associated data.

When the group of pointers is stored in a cache system, in embodiments, the method comprises (and the primitive list preparation circuit is operable to) (e.g. generating and) storing a cache tag in the (e.g. main memory of the) memory system, e.g. alongside the group of pointers in the cache system. Such a cache tag may be stored for the each of the plurality of pointers in the group. However, in embodiments, the (e.g. each) cache tag is stored for a group of pointers as a whole.

Storing cache tag(s) with the group of pointers may then allow the associated memory address(es), where the group of pointers is stored, to be identified.

The cache tag may comprise any suitable and desired information associated with the (e.g. pointers in the) group of pointers. In one set of embodiments the cache tag comprises (e.g. an indication of) the (e.g. x, y coordinates of the) position(s) of the (e.g. regions in the) group of regions in the render output corresponding to the (e.g. pointers in the) group of pointers. This allows existing data to be used as the cache tag, without having to calculate a different cache tag. Using the position for the cache tag may also help to facilitate use of a set-associative cache for the pointers.

When the render output is sub-divided into regions in plural levels of regions, in one set of embodiments, the cache tag comprises (e.g. an indication of) the level of the (e.g. regions in the) group of regions corresponding to the (e.g. pointers in the) group of pointers.

When a group of pointers is stored in a cache line, in embodiments, a cache tag is stored for the group of pointers (such that a cache tag associated with each cache line). When a (e.g. each) group of pointers is stored in multiple cache lines, similarly a cache tag may be stored for the group of pointers (such that only a single cache tag is associated with the multiple cache lines).

The amount of information stored in the cache tag may depend, for example, on how the cache system is arranged, e.g. whether the cache is set-associative or fully associative. A set-associative cache may be used when a (e.g. each) group of pointers is stored in multiple cache lines, e.g. in a cache set. The cache tag may comprise the top bit(s) of the position(s) of the (e.g. regions in the) group of regions in the render output corresponding to the (e.g. pointers in the) group of pointers. The bottom bit(s) of the position(s) of the (e.g. regions in the) group of regions in the render output corresponding to the (e.g. pointers in the) group of pointers may be used to indicate the location of the next cache line (e.g. of the multiple cache lines).

When the render output is sub-divided into regions in plural levels of regions, a cache tag may be stored for the pointer(s) in each hierarchy level (e.g. a cache tag per hierarchy level) or, for example, all of the pointers for the plurality of levels (e.g. one cache tag for the whole group of pointers).

In one set of embodiments, the cache tag (e.g. for the group of pointers for pointer(s) in each hierarchy level) comprises a two-level array.

The two-level array may, for example, comprise a first level comprising a plurality of entries, and a second level comprising a plurality of arrays, wherein each of the plurality of entries in the first level is associated with one of the plurality of arrays in the second level (and, e.g., each array in the second level comprising a plurality of entries). Each of the entries in the first level may be associated with a group of regions (e.g. within a hierarchy level) or with the regions within a hierarchy level of a group of regions (when the group of regions includes regions in multiple hierarchy levels).

In embodiments, (e.g. each entry in) the first level comprises information relating to the group of pointers and/or regions. For example, this information may comprise (e.g. an indication of) the hierarchy level of the group of regions (associated with the group pointers), and/or (e.g. an indication of) the (e.g. x, y) position of the group of regions (e.g. within the hierarchy level).

In embodiments, (e.g. each array in) the second level comprises information relating to the (individual) pointers and/or regions. For example, this information may comprise (e.g. an indication of) the (e.g. x, y) position of the (e.g. each) region (e.g. for the regions that are associated with the respective entry in the first level of the array).

The (e.g. primitive list preparation circuit and/or the second region of the memory system of the) graphics processing system may be arranged in any suitable and desired way to store the group of pointers together (e.g. in the same cache line) in the second region of memory. In one embodiment the method comprises (and the primitive list preparation circuit is operable to) allocating a plurality of memory addresses for the respective plurality of pointers in the group of pointers, wherein the plurality of memory addresses comprises a plurality of neighbouring (e.g. consecutive) memory addresses (e.g. in a cache line).

Allocating neighbouring (e.g. consecutive) memory addresses to the pointers in a group of pointers (that correspond to a group of regions) helps to locate the pointers close together in memory, such that when primitive lists for neighbouring regions of the render output are required to be fetched, the pointers required are likely to be close together in the memory. This facilitates an efficient use of the memory.

In one set of embodiments, a group of pointers is allocated memory addresses having a number of consecutive memory addresses that is equal to the number of pointers (and regions) in the group of pointers. For example, when there are eight regions that correspond to a group of eight pointers, the offset of the memory addresses may be 0, 1, 2, 3, 4, 5, 6, 7, e.g. for the first group of regions in the render output. Subsequent groups of regions would then have different consecutive memory addresses, for example.

In embodiments in which the size of the groups of regions are not all the same (i.e. some groups of regions have fewer regions), e.g. when wrapping to the next row of the render output is prevented, the same number of memory addresses for the group of pointers may be allocated for each of the groups of pointers; however, not all of the memory addresses may be used.

When the render output is sub-divided into regions in plural levels of regions, in embodiments, the pointers to the primitive lists for the regions in all of the plural levels of regions (for the regions in the different levels that correspond to each other) are stored in the same group of pointers. Thus, in embodiments, such a group of pointers (corresponding to a groups of adjacent regions and corresponding regions in different hierarchy levels) is allocated memory addresses having a number of consecutive memory addresses that is equal to the number of pointers (and regions) in the group of pointers.

For example, when there are eight adjacent regions in a first level that correspond to eight pointers in a group and two corresponding regions in a second level that correspond to two further pointers in the group, the offset of the memory addresses may be 0, 1, 2, 3, 4, 5, 6, 7, 8, 9, e.g. for the first group of regions in the render output. Subsequent groups of regions would then have different consecutive memory addresses, for example.

The memory addresses for the (e.g. plurality of pointers in the) group of pointers may be allocated (e.g. calculated) in any suitable and desired way. In one embodiment the method comprises (and the primitive list preparation circuit is operable to) calculating a plurality of memory addresses for the respective plurality of pointers in the group of pointers using the cache tag associated with the group of pointers. This may allow, for example, the memory addresses to be allocated based on the position of the regions associated with the group of pointers. The memory addresses for the plurality of pointers may be calculated using the cache tag and, for example, incrementing the address for each of the plurality of pointers by an offset (so to allocate different memory addresses for each of the plurality of pointers in the group of pointers).

In the technology described herein, a render output (e.g. frame) is sub-divided into a plurality of regions for rendering. Each region corresponds to a respective area of the render output. This sub-division may be performed in any suitable manner, as desired. The regions are arranged in a plurality of rows and columns, thus forming an array of regions over the render output. In embodiments, the regions are (e.g. tessellating) rectangles, e.g. squares, but other arrangements would be possible. Thus, in embodiments, the render output is sub-divided into a (e.g. rectangular) array of regions.

The plurality of regions (e.g. of the first size and/or the second size), into which the render output is sub-divided for sorting the primitives, may correspond to the plurality of tiles into which the render output is sub-divided for rendering, e.g. a region may comprise a tile. Therefore, in some embodiments, the render output is sub-divided into tiles in a plurality of different ways for the purposes of rendering, e.g. a plurality of tiles (each) of a first size (in a first level of tiles) and a plurality of tiles (each) of a second size for (in a second level of tiles).

The group of regions (corresponding to the group of pointers) comprises regions spanning a plurality of (e.g. adjacent) rows and columns of regions.

The primitive lists of the technology described herein may have any suitable correspondence with the regions (e.g. tiles) into which the render output is sub-divided. For example, a primitive list may be prepared for each region (e.g. tile), on a one-to-one basis. However, it may also be the case that a primitive list is prepared for a plurality of regions (or, e.g., a region or regions in multiple different hierarchy levels), or that multiple primitive lists are prepared that cover a single region. Various arrangements are possible in this regard and the technology described herein may be applied to any suitable primitive lists.

Whilst the technology described herein has been described above primarily in relation to preparing a single primitive list, for a respective region of the render output, it will be appreciated that the graphics processing system typically, and in embodiments, will prepare a plurality of primitive lists, e.g. so that all of the regions into which the render output is divided for the purposes of sorting the primitives have a corresponding one or more primitive lists. Thus, in embodiments, the steps described above are repeated in order to prepare a plurality of primitive lists.

Likewise, whilst the technology described herein is described above in relation to storing data for a sequence of primitives, it will be appreciated that a given render output may have multiple sequences of primitives defined for it, and, in embodiments, all of the primitive sequences are processed in the same way.

The description above focusses on the preparation of the primitive lists. In embodiments, the primitive lists that are generated in this way are then written back to memory so that they may subsequently be fetched into a rendering pipeline of the graphics processor for rendering the scene (although other arrangements would of course be possible; for example, the primitive lists may be written out directly to local storage on the graphics processor for access by the rendering pipeline).

Once the primitive lists have been generated and written out, the primitive lists may then be used, e.g. in the normal way, to generate the desired render output. For instance, once the primitives and their vertices have been defined, and the vertex data obtained, this vertex data may then be processed by a graphics processing system, in order, e.g. to display the desired render output. This processing basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively. These processes may use the primitive lists generated according to the technology described herein. Particularly, the system may read the primitive lists in order to determine which primitives need to be rendered for which tile (thus avoiding unnecessary processing for any primitives that do not appear in a particular tile).

As will be appreciated from the above, in embodiments, the technology described herein is implemented in a system comprising a memory system, a cache system, and a graphics processing unit (GPU) (a graphics processor). In embodiments, data for a render output (e.g. image to be displayed) is stored in a memory of the memory system. In embodiments, the GPU is arranged to fetch required data from the memory and to store it in the cache system. In embodiments, the GPU then reads required data from the cache system for generating the render output. In embodiments, the render output, once generated in this way, is then displayed, e.g. on a display such as a screen or the like.

The graphics processing unit (graphics processor) will, and in embodiments does, implement and execute a graphics processing pipeline to perform graphics processing.

In embodiments, the graphics processing system includes a host processor that executes applications that may require graphics processing by the graphics processing unit (processor). In embodiments, the system further includes appropriate storage (e.g. memory), caches, etc., as described above.

The technology described herein may be used in and with any suitable and desired graphics processing system and processor.

The technology described herein is particularly suitable for use with tiled renderers (tile-based graphics processing systems). Thus, in embodiments, the graphics processor (processing pipeline) is a tiled-based graphics processor (processing pipeline).

So, the primitive lists generated according to the technology described herein may be passed into a graphics processing (rendering) pipeline, and used thereby in order to render a desired output. The graphics processing unit (processor) (processing pipeline) may contain any suitable and desired processing stages that a graphics processor (processing pipeline) may contain. In embodiments, it includes, e.g. in this order, one or more (e.g. all) of: a primitive setup stage, a rasteriser and a renderer. In embodiments, the renderer is in the form of or includes a (e.g. programmable) fragment shader (a shader core).

In embodiments, the graphics processor (processing pipeline) also comprises one or more programmable shading stages, such as one or more (e.g. all) of: a vertex shading stage, a hull shader, a tessellation stage (e.g. where tessellation is performed by executing a shader program), a domain (evaluation) shading stage (shader), a geometry shading stage (shader), a fragment shader, a varyings position evaluation (interpolator) associated with the fragment shader, etc.

The graphics processor (processing pipeline) may also contain any other suitable and desired processing stages that a graphics processing pipeline may contain such as a (early and/or late) depth (or depth and stencil) tester(s), a blender, a tile buffer or buffers, a write out unit, a tile write back unit, etc.

Accordingly, the technology described herein also extends to graphics processing systems, and methods of graphics processing, that use the primitive lists prepared according to embodiments of the technology described herein.

So, in embodiments, the technology described herein comprises a method of graphics processing comprising preparing a set of primitive lists according to the methods of the technology described herein, and then using the primitive lists to render an output.

When primitive lists are used, in embodiments they are decoded, e.g. with the decoding operating in reverse to the encoding described above. Thus, a primitive list reader is configured to read the sequence of commands for the primitive list, identify the respective type of command, and then decode the stored information appropriately for use during the rendering process.

In embodiments, the technology described herein comprises a graphics processing system comprising a tiler pipeline for preparing a set of primitive lists substantially as described above according to any embodiments of the technology described herein, and a graphics processor that is configured to use the primitive lists when rendering an output. The graphics processor may suitably comprise a graphics processing (rendering) pipeline, e.g. as described above.

Although the above embodiment has been described with reference to using the primitive lists to indicate primitives to be rendered for the rendering process, it will be appreciated these lists could also or instead be used for other purposes, such as to perform (e.g. initial) culling, and/or hidden surface removal, of graphics data and descriptors.

The technology described herein may generally find application in any suitable tile-based rendering graphics processing system.

The technology described herein may be used for all forms of output that a graphics processing system (tile-based or otherwise) may be used to generate. In embodiments, it is used when a graphics processing system is being used to generate images or frames for display, but it may be used for any other form of graphics processing output that a graphics processing system may produce, as desired, e.g. render to texture outputs.

In some embodiments, the graphics processing system comprises, and/or is in communication with, one or more memories and/or memory devices that store the data described herein, and/or store software for performing the processes described herein. The graphics processing system may also be in communication with a host microprocessor, and/or with a display for displaying images based on the data generated by the graphics processing system.

In embodiments, the various functions of the technology described herein are carried out on a single graphics processing platform that generates and outputs the rendered fragment data that is, e.g., written to a frame buffer for a display device.

The technology described herein may be implemented in any suitable system, such as a suitably configured microprocessor based system. In embodiments, the technology described herein is implemented in a computer and/or micro-processor based system.

The various functions of the technology described herein may be carried out in any desired and suitable manner. For example, the functions of the technology described herein may be implemented in hardware or software, as desired. Thus, for example, the various functional elements, stages, and pipelines of the technology described herein may comprise a suitable processor or processors, controller or controllers, functional (e.g. fixed-function) units, circuits/circuitry, processing logic, microprocessor arrangements, etc., that are operable to perform the various functions, etc., such as appropriately configured dedicated hardware elements or processing circuits/circuitry, and/or programmable hardware elements or processing circuits/circuitry that may be programmed to operate in the desired manner.

It should also be noted here that, as will be appreciated by those skilled in the art, the various functions, etc., of the technology described herein may be duplicated and/or carried out in parallel on a given processor. Equally, any one or more of the processing stages and processing stage circuits/circuitry of the technology described herein may be provided as a separate circuit element to any one or more of the other processing stages or processing stage circuits/circuitry, and/or any one or more or all of the processing stages and processing stage circuits/circuitry may be at least partially formed of shared processing circuits/circuitry.

Thus the technology described herein extends to a graphics processor and to a graphics processing platform including the apparatus of or operated in accordance with the technology described herein. Subject to any hardware necessary to carry out the specific functions discussed above, such a graphics processor may otherwise include any one or more or all of the usual functional units, etc., that graphics processors include.

It will also be appreciated by those skilled in the art that all of the described embodiments of the technology described herein may include, as appropriate, any one or more or all of the optional features described herein.

The methods in accordance with the technology described herein may be implemented at least partially using software, e.g. computer programs. Thus, in embodiments, the technology described herein comprises computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system.

The data processing system may be a microprocessor system, a programmable FPGA (field programmable gate array), etc.

The technology described herein also extends to a computer software carrier comprising such software which when used to operate a graphics processor, renderer or other (e.g. microprocessor) system comprising data processing means causes in conjunction with said data processing means said processor, renderer or system to carry out the steps of the methods of the technology described herein. Such a computer software carrier could be a physical storage medium such as a ROM chip, RAM, flash memory, CD ROM or disk.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory or hard disk. The series of computer readable instructions embodies all or part of the functionality previously described herein.

Those skilled in the art will appreciate that such computer readable instructions may be written in a number of programming languages for use with many computer architectures or operating systems. Further, such instructions may be stored using any memory technology, present or future, including but not limited to, semiconductor, magnetic, or optical. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

Like reference numerals are used for like elements and features in the Figures, where appropriate.

A number of embodiments of the technology described herein will now be described in the context of graphics processing systems.

The present embodiments relate to graphics processing systems that use so-called "tile-based" rendering. In tile-based rendering, the two-dimensional scene to be displayed is sub-divided or partitioned into a plurality of smaller sub-regions, that will be referred to as "tiles". The tiles are each rendered separately (typically one-after-another) and the rendered tiles are then recombined to provide the complete frame for display. In such arrangements, the scene is typically divided into regularly-sized and shaped sub-regions (tiles) (they are usually, e.g., squares or rectangles) but this is not essential.

In a tile-based rendering system, in a first processing pass, a list of primitives (i.e. a "primitive list", which may also be known as a "tile list" or "polygon list") to be rendered for each tile is prepared, identifying (e.g. by reference to a primitive indicator) those primitives that are present in, and need to rendered for, a given tile. The process of preparing primitive lists for a tile typically involves determining (at a desired level of accuracy) the primitives that intersect (i.e. that will appear (at least in part) within) the tile in question, and then preparing a list of those primitives for future use by the graphics processing system.

The process of determining the primitives that should be listed (rendered) for any given tile may be carried out at varying levels of precision, for example depending on efficiency optimisations for different parts of the tiling and rendering processes. For example, at the most precise level, it could be determined exactly which tiles a given primitive will appear at least in part in, and the primitive then included in the primitive lists for those tiles only. This is commonly referred to as "exact" binning.

FIG. 1 illustrates an exact binning process. As shown in FIG. 1, the scene 1 to be displayed is divided into sixteen regularly sized sub-regions or tiles 2. It is then determined for each primitive in the scene, which tile or tiles the primitive actually appears (falls) within. The primitive is added to the primitive lists for each tile that it is found to fall within. Thus, taking the example shown in FIG. 1, the primitive 3 is added to the primitive lists for tile 4, the primitive 5 is included in the primitive lists for tiles 6 and 7, the primitive 8 is included in the primitive lists for tiles 9, 10, 11 and 12, and the primitive 13 is included in the primitive lists for tile 12. (It should be noted here that FIG. 1 shows only a few tiles and primitives for clarity purposes. As will be appreciated by those skilled in the art, in an actual graphics processing operation, there will typically be many more primitives and tiles.)

It is also known to prepare primitive lists with a lower precision than is achieved with exact binning. This may be useful to, e.g., simplify the preparation of the primitive lists. One common "less precise" binning technique is "bounding box" binning. In this case, a so-called "bounding box" is drawn around a primitive or a set of primitives, and then the tiles covered by the bounding box are determined. The primitive or primitives that the bounding box represents (i.e. that are encompassed by the bounding box) are then listed (binned) for each tile that the bounding box has been found to cover (at least in part).

This arrangement thus uses a bounding box to determine the tiles for which a given primitive should be listed to be rendered, rather than the primitive itself. This may mean, e.g., that a primitive may be listed for rendering for a tile that it does not actually fall within (e.g. when the bounding box does not sufficiently tightly or precisely surround the primitive), but on the other hand, the use of bounding boxes in this manner may simplify the preparation of the primitive lists.

Where a primitive falls into more than one tile, it is included in the list (bin) for each tile that it falls within. These primitive lists may be prepared for each tile individually (so that there is a one-to-one correspondence between the tiles and primitive lists). However, it will be appreciated that in some cases, or for at least some of the tiles, a primitive lists may cover a set of plural tiles.

Once lists of primitives to be rendered (primitive lists) have been prepared for each sub-region (tile) in this way, the primitive lists are stored for use, e.g., to allow the system to identify which primitives need to be considered (and rendered) when the tile in question is rendered.

Such tile-based rendering arrangements have been found to work well, as they may, for example, help to avoid primitives still being processed for regions of the scene where they are not present.

Figure 2:
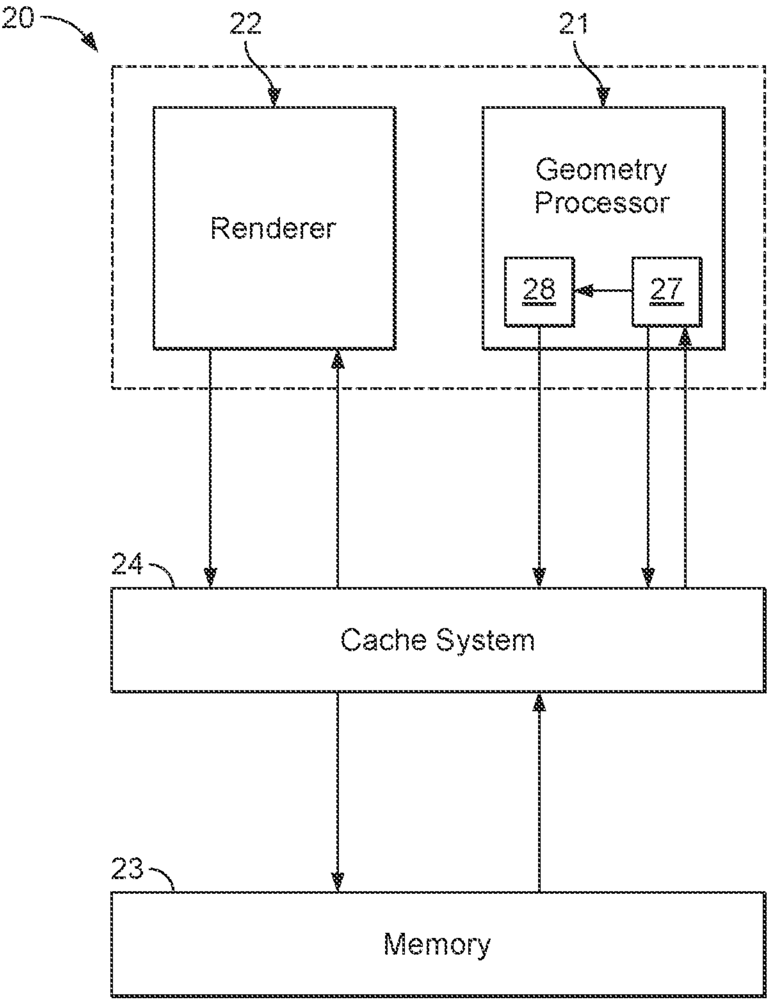
FIG. 2 shows schematically an arrangement of a graphics processor that may operate in accordance with the technology described herein.

FIG. 2 shows schematically a graphics processor 20 that may be operated in accordance with the technology described herein. The graphics processor 20 includes a geometry processor 21 and a renderer 22, and has access to a memory 23. The memory 23 may be "on-chip" with the geometry processor 21 and renderer 22, or may be an external memory that can be accessed by the geometry processor 21 and renderer 22. As shown in FIG. 2, the graphics processor 20 interfaces with the memory 23 via a cache system 24, the operation of which will be explained in further detail below.

The memory 23 stores, inter alia, and as shown in FIG. 2, a set of raw geometry data (which is, for example, provided by the graphics processor driver or an API running on a host system (microprocessor) of the graphics processor 20) which is provided as input to the geometry processor 21 for processing during an initial processing pass.

For instance, the geometry processor 21 may comprise, inter alia, a programmable vertex shader 27, and a primitive lists building unit 28. The programmable vertex shader 27 takes as it input the raw geometry data stored in the memory 23, and processes that data to provide transformed geometry data (which is the result of various transformation and processing operations carried out on the raw geometry) comprising the geometry data in a form that is ready for two-dimensional ('2D') placement in the frame to be displayed. The transformed geometry data comprises, for example, transformed vertices (vertex data), etc. The programmable vertex shader 27 and the processes it carries out may take any suitable form and be any suitable and desired such processes.

The primitive lists building unit 28 carries out the process of preparing the primitive lists by allocating the primitives to the primitive lists which are then used by the renderer 22 to identify the primitives that should be rendered for each tile of the scene to be rendered. To do this, the primitive lists building unit 28 takes as its input the transformed and processed vertex data from the programmable vertex shader 27 (i.e. the positions of the graphics object in the scene), builds primitive lists using that data, and stores those lists as the primitive lists.

The transformed geometry data and primitive lists generated by the geometry processor 21 during the first processing pass are then written back to the memory 23 so that this data may be subsequently fetched into and used by the renderer 22 in order to generate the render output (e.g. frame for display). Data may also be stored locally, inside the geometry processor 21.

According to the embodiments of the technology described herein, and as shown in FIG. 2, this data is stored in the cache system 24.

To generate a render output, the renderer 22 will, in essence, determine which of the primitives should be rendered for a given tile, and then render and store data for that tile (e.g. in a frame buffer) so that the image of the primitive may be properly displayed, e.g. on a display device.

Figure 3:
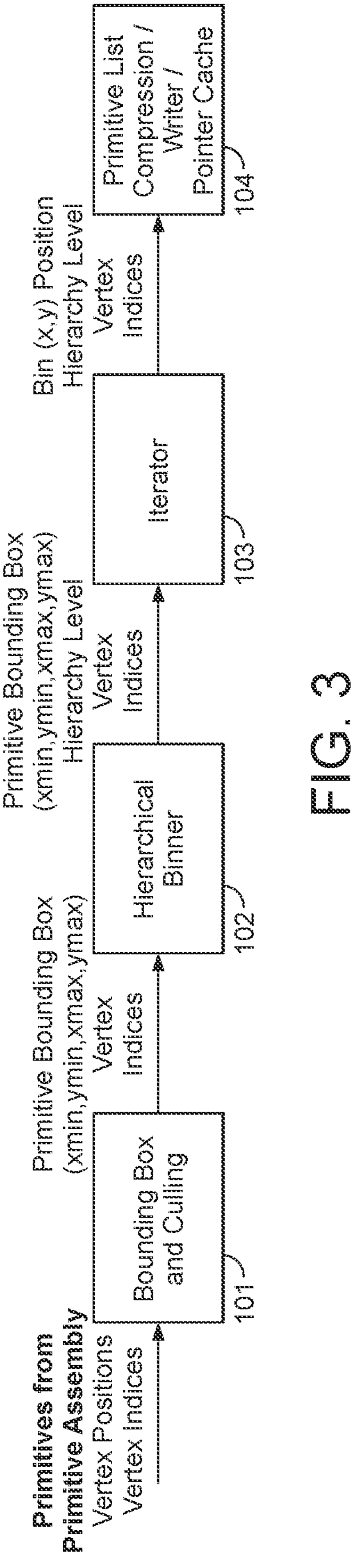
FIG. 3 shows a flow chart of steps in the process of preparing primitive lists.

The process of preparing the primitive lists will now be described with reference to FIG. 3. FIG. 3 shows a flow chart of steps in the process of preparing the primitive lists according to a "bounding box" binning technique.

In this process, the primitives that have been assembled (from the vertex data of vertex positions and indices) are processed in a bounding box and culling step 101. In this step 101, bounding boxes are associated with defined regions of the render output. The defined regions may correspond to tiles or groups of tiles. Alternatively, bounding boxes may be associated with respective primitives and each bounding box enlarged or shrunk to the tile size in the hierarchy level that is being processed at the hierarchical binning step 102. The primitive or primitives that are encompassed by the bounding box are listed for the region (and passed onto the next step) and any primitives that fall outside of the bounding box are culled.

Data representing the selected primitive or primitives are then passed to a hierarchical binning step 102, with data indicating the coordinates of the bounding box(es) with which (each of) the primitives are associates and the vertex indices for the primitive(s) that have been selected for that (each) bounding box being passed to this next step.

Regions (associated with bounding boxes) may be defined in different levels of a hierarchy. For example, in a lower level, regions may correspond to tiles. In a higher level, regions may correspond to groups of tiles. Bounding boxes may thus be defined for regions in different levels of the hierarchy. Thus, primitives may fall within bounding boxes in different levels of the hierarchy.

Figure 4:
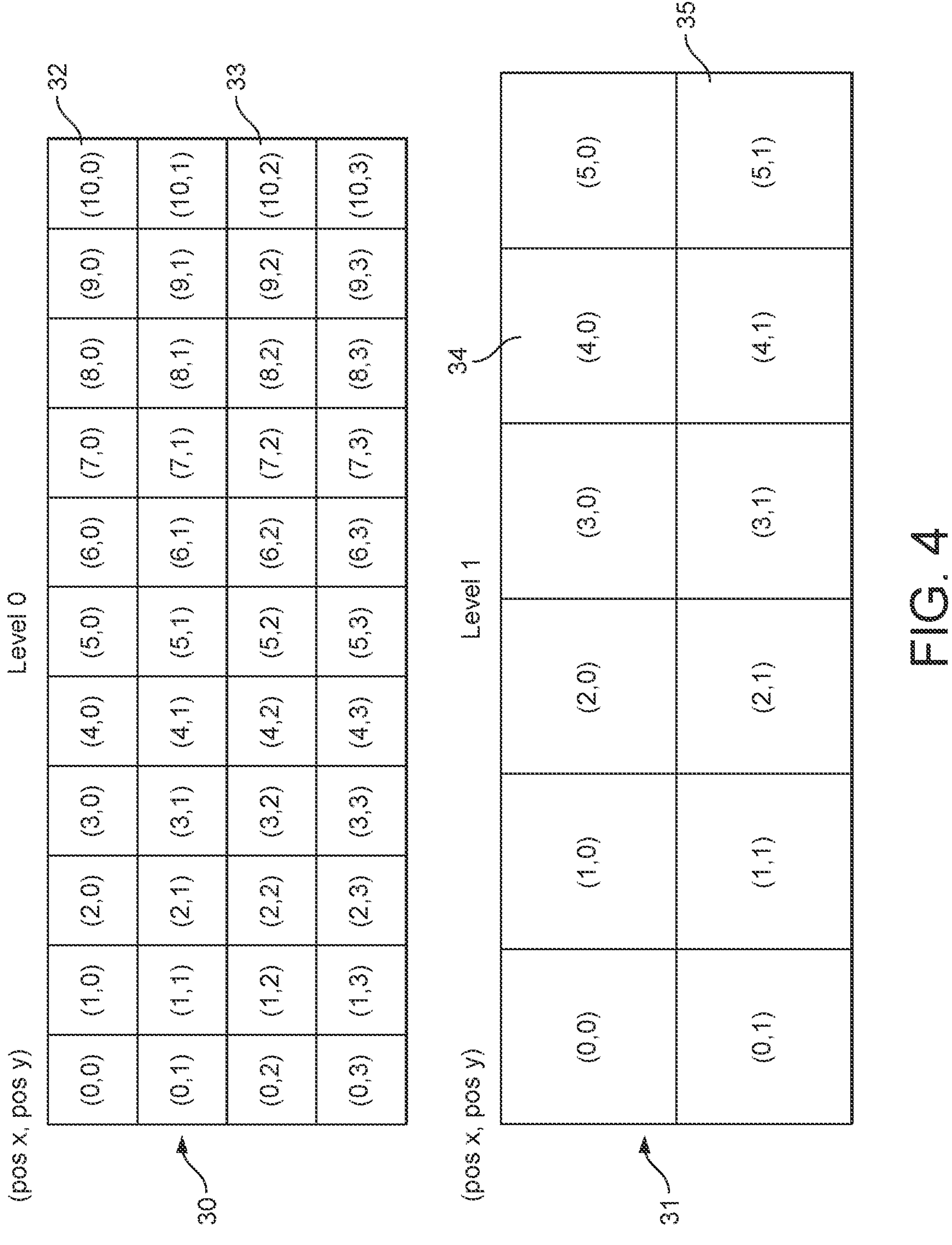
FIG. 4 shows schematically a hierarchy of levels of regions of a render output, the regions being used for the purposes of sorting the primitives.

FIG. 4 shows schematically a hierarchy of levels of regions of a render output, the regions being used for the purposes of sorting the primitives. In this example, two levels 30, 31 of a hierarchy are shown (in other examples, more levels may be used). In a first level 30 of the hierarchy, the render output is divided into smaller regions 32, 33, e.g. each corresponding to a tile of 16×16 sampling points (e.g. pixels).

In a second level 31 of the hierarchy, the render output is divided into larger regions 34, 35, e.g. each corresponding to a tile of 32×32 sampling points (e.g. pixels). The regions of the second level 31 each correspond to four regions of the first level 30, e.g. regions (0,0), (1,0), (0,1) and (1,1) of the first level 30 correspond to region (0,0) of the second level 31.

In each level 30, 31 of the hierarchy, the regions 32, 33, 34, 35 are labelled with simple x, y coordinates.

Depending on the size and shape of the render output, the regions 32, 33, 34, 35 of the first and second levels 30, 31 of the hierarchy may extend further than the actual render output.

In the hierarchical binning step 102 shown in FIG. 3, it is determined in which level(s) of the hierarchy the tiles lie, into which the primitive(s) within the bounding box fall, e.g. as illustrated in FIG. 4. Data indicating the coordinates of each bounding box, the hierarchy level of the tiles and the vertex indices for the primitive(s) that have been selected for that (each) bounding box are passed to the next step.

In an iterator step 103, the iterator iterates over all the tiles ("bins") in the different hierarchy levels that are within each bounding box and the coordinates of the (corners of the) tiles (as simpler x, y positions), indicating a ("bin") position of the tile in the render output, where each tile is labelled with a single (integer) x, y coordinate (e.g. as shown in FIG. 4), is determined. Data indicating the bin (tile) position of each tile, the hierarchy level and the vertex indices for the primitive(s) that have been selected for that (each) bounding box are passed to the next step.

In a final step 104, using the data of the list of the bin positions, the hierarchy levels and the vertex indices, a list of primitives for each region of the render output (in each of the hierarchy levels) is compiled. These primitives lists are then stored in the memory 23.

To enable the primitive lists to be retrieved by the graphics processor 20 when primitives are required for processing (e.g. for rendering), respective pointers to the primitive lists are generated and stored. Thus a pointer is generated and stored for each region of the render output. The pointers are allocated a memory address in the memory 23 and are written out to the cache 24 (the pointers may be written out to the memory 23 at this same or a later time, depending on the cache policy in operation).

Figure 5A:
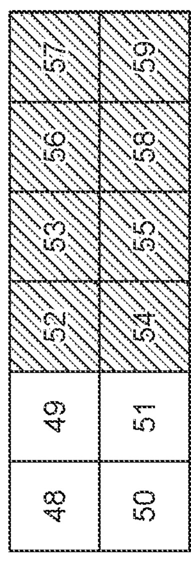
FIG. 5*b*** shows the arrangement with two primitives to be processed superimposed.
Figure 5A:
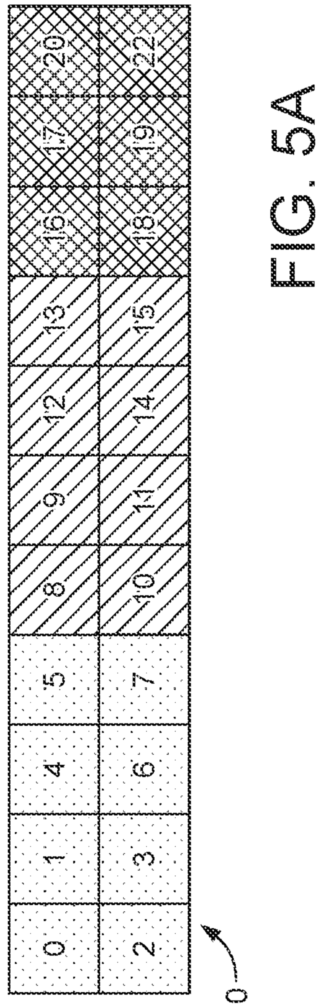
Figure 5B:
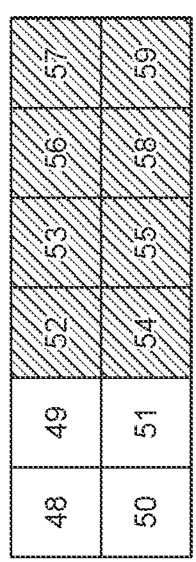
Figure 5B:
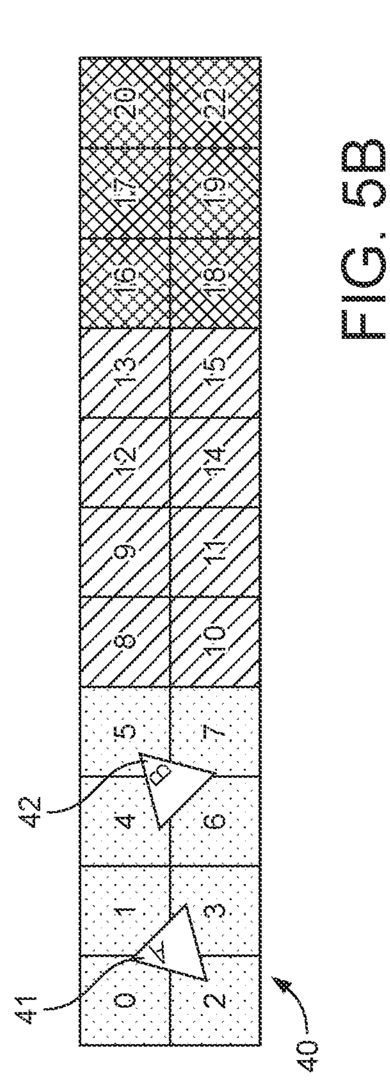

To facilitate an efficient use of the cache 24 (e.g. when the primitive lists are being used for rendering), the (e.g. offsets relative to the base memory address of the) memory addresses of the pointers are arranged as shown in FIG. 5*a*. FIG. 5*a* shows an arrangement of primitive list pointers according to an embodiment of the technology described herein and FIG. 5*b* shows the arrangement with two primitives to be processed superimposed.

FIG. 5*a* shows regions (e.g. 16×16 tiles) of a render output 40 and the memory address offset (relative to the base memory address) for each region. For the purpose of simplicity, only the first two rows of regions are shown and not all of the regions in these rows are shown.

The regions are divided into groups of eight regions, each group spanning two rows and four columns. The groups are arranged such that they are prevented from wrapping round at the end of a (pair of) row(s) to the beginning of the next (pair of) row(s).

The pointers for these regions of a group of regions, to the respective primitive lists for these regions, may be stored in a single cache line. This means that when the pointers are retrieved from the memory 23, e.g. to be read into the cache 24, all of the pointers for the group of regions are fetched at the same time, i.e. as part of the same cache read.

The memory address offset of the regions in a group may be arranged in any suitable and desired way. One example is shown in FIG. 5*a*, i.e. the first row of the first group having address offsets 0, 1, 4, 5 and the second row of the second group having address offsets 2, 3, 6, 7.

The second group of regions has memory address offsets 8, 9, 12, 13 in the first row and 10, 11, 14, 15 in the second row. The same pattern of memory address offsets is repeated for each group of regions in the first two rows of the render output 40, and for each group of regions in each subsequent pair of rows of the render output 40.

The effect of this arrangement of the memory address offsets is shown in FIG. 5*b*, where two primitives 41, 42 are superimposed over the regions of the render output 40. The primitive 41 labelled "A" spans regions having memory address offsets 0, 1, 2, 3 and the primitive 42 labelled "B" spans regions having memory address offsets 4, 5, 6, 7. Thus, when the primitive lists are prepared for these regions, the primitive 41 labelled "A" will appear in the primitive lists for the regions having memory address offsets 0, 1, 2, 3, and the primitive 42 labelled "B" will appear in the primitive lists for the regions having memory address offsets 4, 5, 6, 7.

It will be appreciated that arranging the memory addresses of the pointers in this way makes for efficient use of the cache. When the primitives 41, 42 labelled "A" and "B" are to be processed, the primitive lists required for the regions that they span are all associated with the regions of the first group of regions (having memory address offsets 0 to 7 for the pointers to the primitive lists). Thus, the pointers required are all within the same cache line, such that all the pointers for the group of regions will be returned in a single cache line read.

Figure 6A:
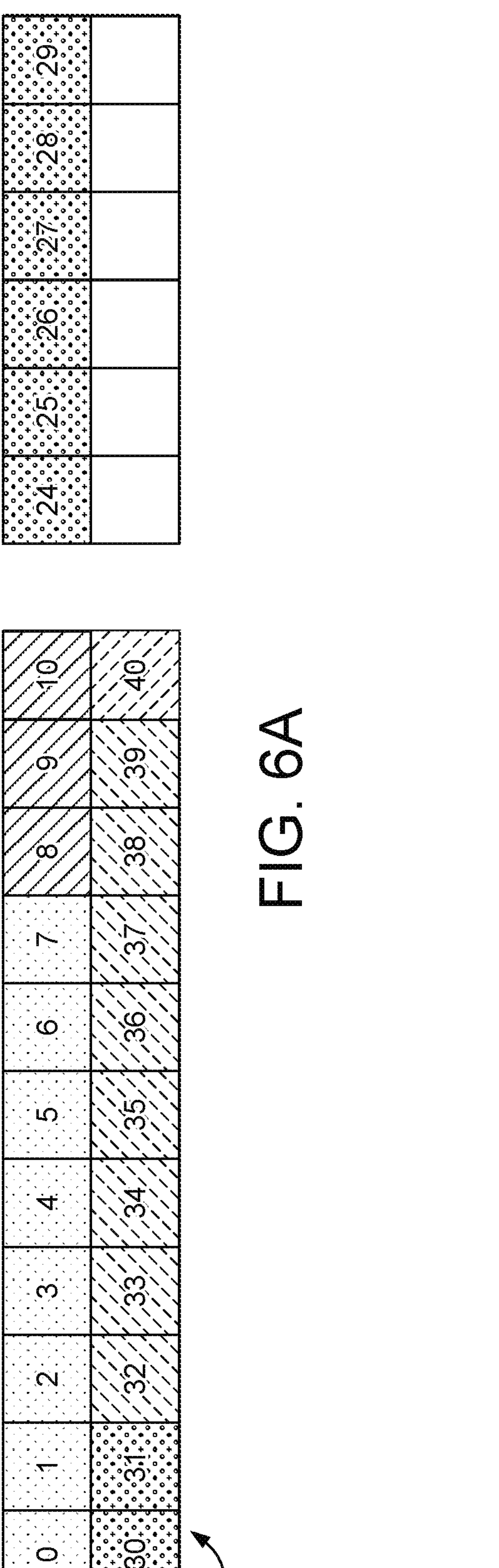
FIG. 6*b*** shows the arrangement with two primitives to be processed superimposed.
Figure 6B:
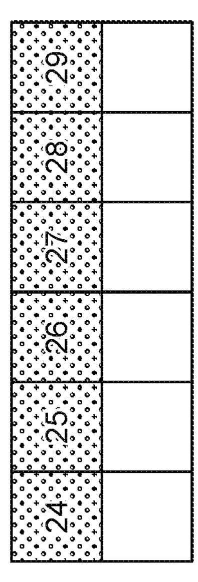
Figure 6B:
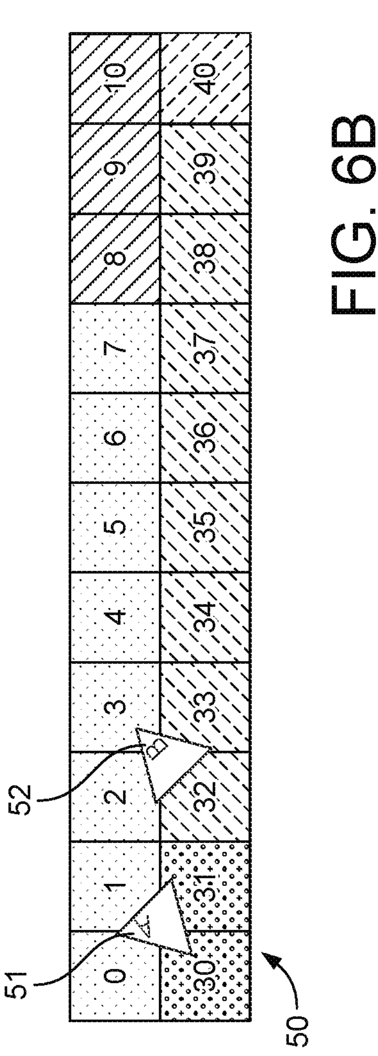

This contrasts with the arrangement shown in FIGS. 6*a* and 6*b*. FIG. 6*a* shows a different arrangement of primitive list pointers and FIG. 6*b* shows the arrangement with two primitives to be processed superimposed.

In the example shown in FIGS. 6*a* and 6*b*, the groups of regions are arranged in a simple linear manner. For the render output 50 shown in FIGS. 6*a* and 6*b*, with thirty regions in each line of the render output 50, the linear arrangement of the groups of regions results in some regions wrapping round between two different rows, such that the group is split between the end of one row and the beginning of the next row.

The result of this, as shown in FIG. 6*b*, is that when the primitives 51, 52 labelled "A" and "B" are to be processed, the primitive lists required for the regions that they span are associated with three different groups of regions. Thus, the pointers required are within three different cache lines, such that the pointers for the group of regions will require multiple cache reads.

Figure 7:
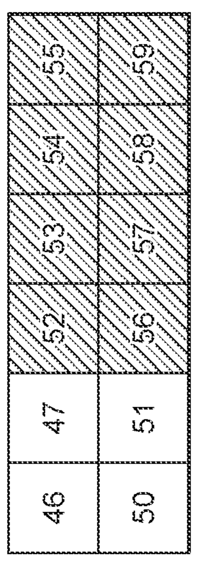
FIG. 7 shows an arrangement of primitive list pointers according to the technology described herein.
Figure 7:
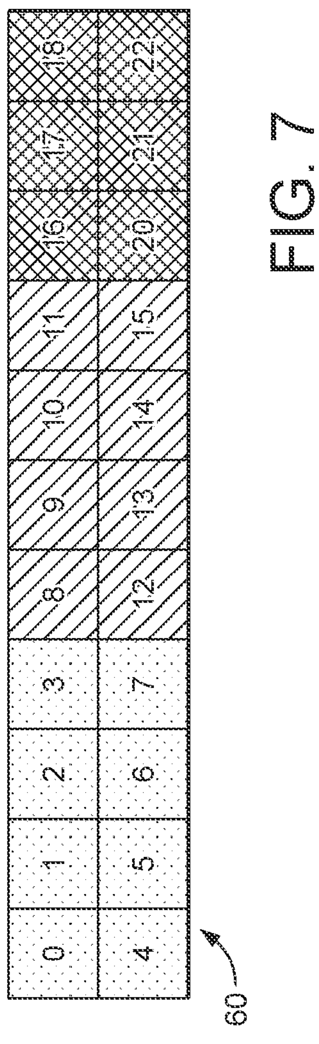

FIG. 7 shows an arrangement of primitive list pointers according to an embodiment of the technology described herein.

The arrangement of the regions of the render output 60 shown in FIG. 7 is similar to the arrangement shown in FIGS. 5*a* and 5*b*. As will be seen from FIG. 7, the groups of regions (each containing eight regions) are arranged in the same way as the arrangement shown in FIGS. 5*a* and 5*b*, such that each group spans two rows and four columns, and the groups are prevented from wrapping round between rows.

The difference between the arrangement shown in FIG. 7 and the arrangement shown in FIGS. 5*a* and 5*b* is the arrangement of the memory address offsets within each group of regions. Thus, in FIG. 7, the first row of the first group has address offsets 0, 1, 2, 3 and the second row of the second group has address offsets 4, 5, 6, 7.

The second group of regions has memory address offsets 8, 9, 10, 11 in the first row and 12, 13, 14, 15 in the second row. The same pattern of memory address offsets is repeated (and calculated) for each group of regions in the first two rows of the render output 60, and for each group of regions in each subsequent pair of rows of the render output 60.

It will be appreciated that the arrangement of the memory addresses of the pointers shown in FIG. 7 has similar advantages as those associated with the arrangement shown in FIGS. 5*a* and 5*b*. This is because the pointers for a group of regions that spans two rows and four columns are stored in the same cache line, and will be returned in a single cache line read. Thus, for primitives that span neighbouring regions (e.g. tiles), it is more likely that that the primitive lists associated with these regions are pointed to by pointers in the same cache line.

Figure 8:
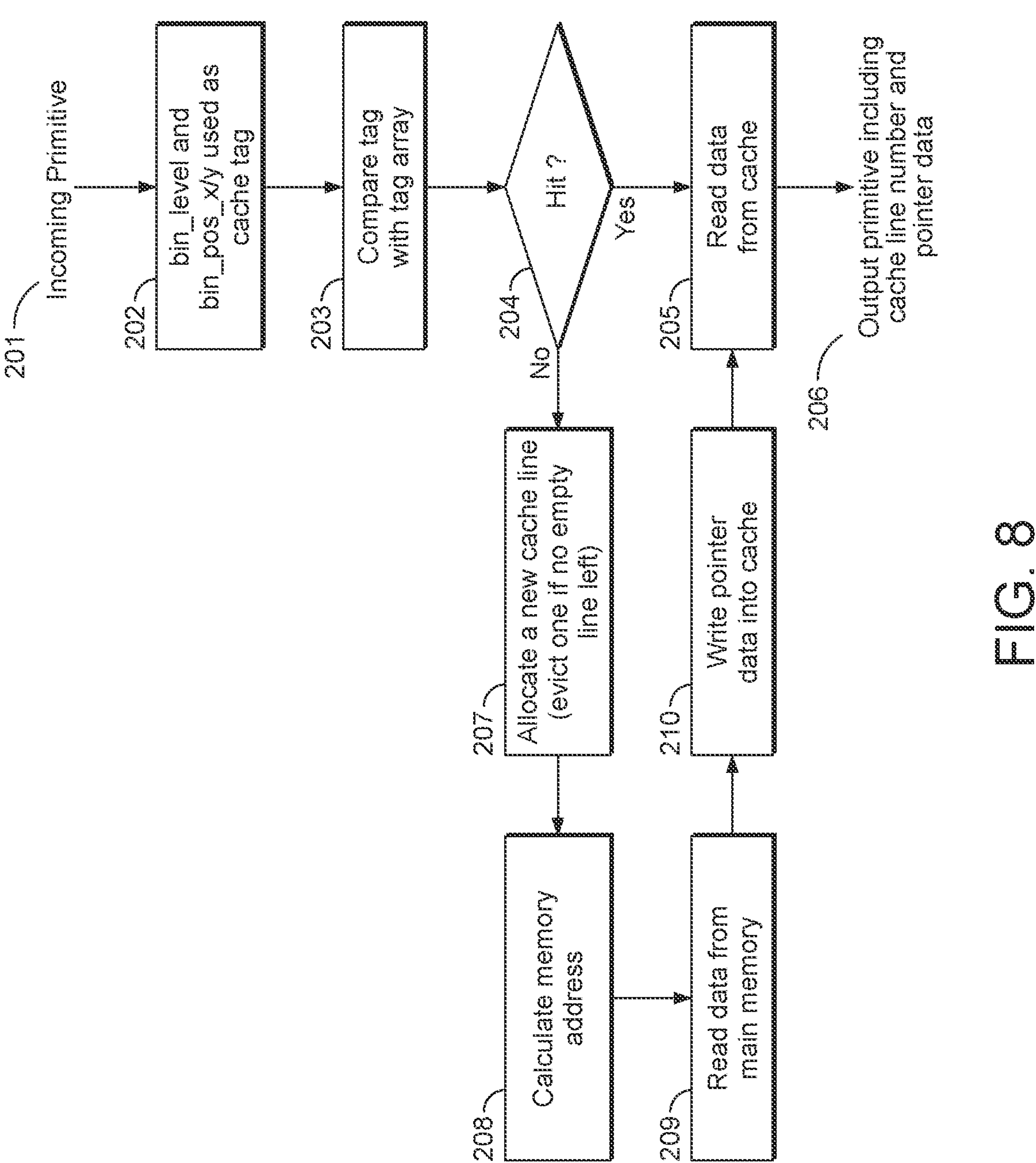
FIG. 8 shows a flow chart of a process of storing primitive lists and associated pointers according to the technology described herein.

The process of storing the primitive lists and the associated pointers will now be described with reference to FIG. 8. FIG. 8 shows a flow chart of a process of storing primitive lists and associated pointers according to an embodiment of the technology described herein.

As shown in FIG. 8, at step 201, a primitive (or primitive list) is received from earlier stages of the pipeline (e.g. directly from the iterator 103 shown in FIG. 3).

This may, for example, have been prepared and stored according to the process described with reference to FIG. 3.

As will be seen from FIG. 3, from the preparation of the primitive (or primitive list), each primitive (or primitive list) has associated with it the bin position (i.e. position of the region (e.g. tile) of the render output being processed) in the form of x, y coordinates, and the hierarchy level of the region. These parameters are set to be used as the cache tag for the pointer that points to the location of the primitive (or primitive list) in the main memory (step 202, FIG. 8).

In order to check if a pointer for the primitive (or primitive list) is already present in the cache, the cache tag set for the pointer is compared with the array of tags that are stored in the cache (step 203, FIG. 8).

At step 204, if the cache tag is present (a cache "hit", indicating that the pointer is already present in the cache), the data associated with the cache tag (i.e. the pointer data) is read from the cache (step 205, FIG. 8).

Reading the pointer data (e.g. the group of primitive list pointers) from the cache then allows the primitive list(s) to be fetched from the main memory using the pointer, with the cache line number and the pointer data being returned (step 206, FIG. 8).

For a different pointer, at steps 203 and 204, when the cache tag set for the pointer is compared with the array of tags that are stored in the cache, if the cache tag is not present (a cache "miss", indicating that the pointer is not present in the cache), then a new line in the cache is allocated for the pointer (step 207, FIG. 8). If there are no empty lines in the cache available for allocation, first a line is evicted (according to an appropriate cache eviction policy) so that it may then be allocated for the incoming pointer.

Once the line in the cache has been allocated, the memory address for the pointer is calculated using the cache tag (step 208, FIG. 8).

The memory address is then used to read the pointer data from the main memory (step 209, FIG. 8) and to write this pointer data into the cache, in the line that has been allocated (step 210, FIG. 8).

Now that the pointer is in the cache, the pointer data may be read from the cache (step 205, FIG. 8). As before, reading the pointer data from the cache then allows the primitive (or primitive list) to be fetched from the main memory using the pointer, with the cache line number and the pointer data being returned (step 206, FIG. 8).

Figure 9:
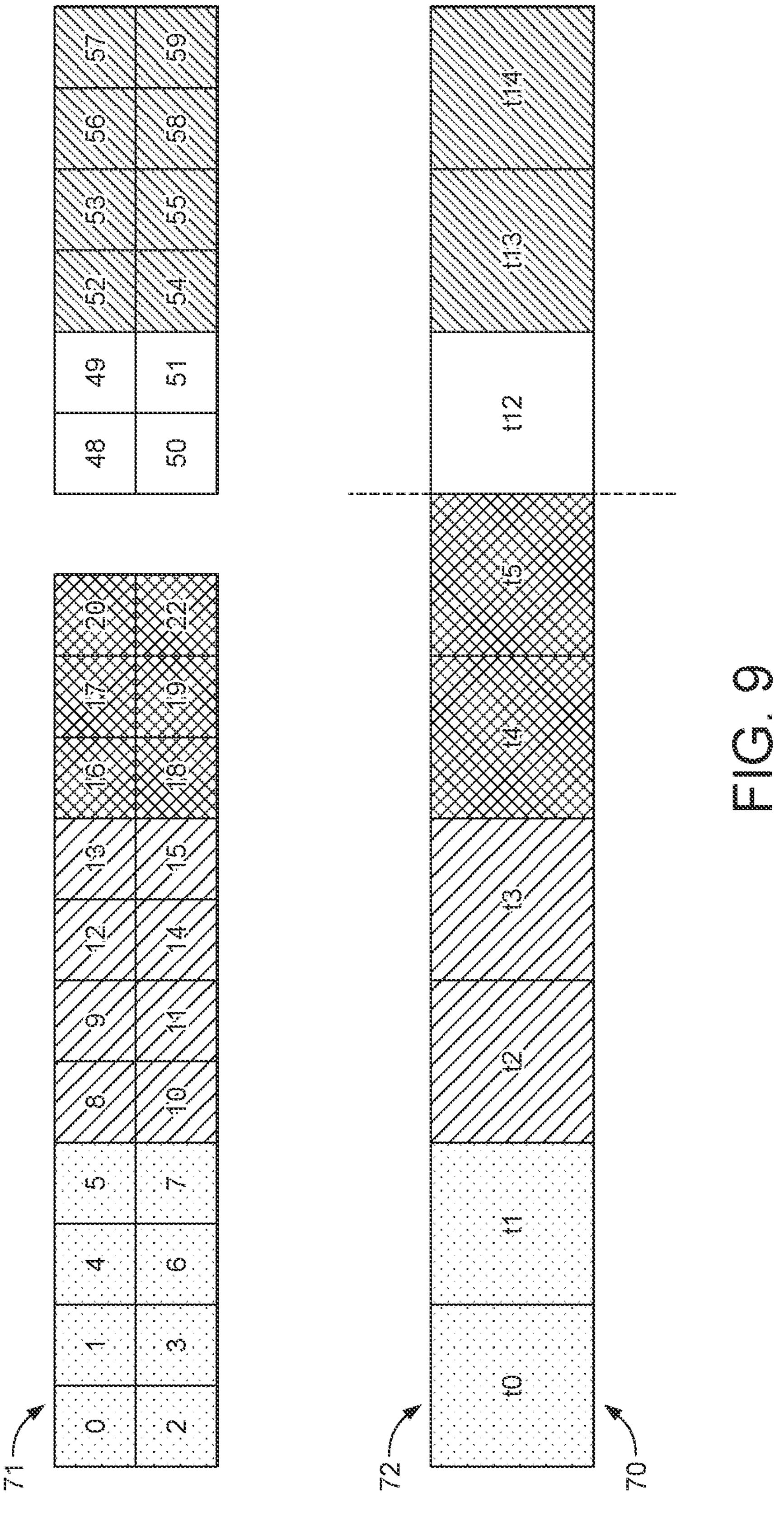
FIG. 9 shows an arrangement of primitive list pointers according to the technology described herein.

FIG. 9 shows an arrangement of primitive list pointers according to an embodiment of the technology described herein. FIG. 9 shows regions of a render output 70 and the memory address offset (relative to the base memory address) for each region in two levels of a hierarchy of levels, e.g. using an array of regions and two levels of a hierarchy as shown in FIG. 4.

Similarly to the regions shown in FIG. 5*a*, a first level 71 of the render output 70 is divided into smaller regions (e.g. 16×16 tiles). A second level 72 of the render output 70 is divided into larger regions (e.g. 32×32 tiles) that each correspond to four regions in the first level 71 of the render output 70. For the purpose of simplicity, only the first two rows of regions are shown in the first level 71 of the render output 72 and only the first row of regions in the second level 72, and not all of the regions in these rows are shown.

As with the arrangement shown in FIG. 5*a*, each group of regions in the first level 71 of the render output 70 contains eight regions. Each group of regions also contains the corresponding two regions in the second level 72 of the render output 70.

For example, the first group of regions of the render output 70 contains the eight regions of the first level 71 labelled with address offsets 0, 1, 2, 3, 4, 5, 6, 7, and the two regions of the second level 72 labelled with address offsets t0, t1. The region of the second level 72 labelled with address offset t0 corresponds to the four regions labelled with address offsets 0, 1, 2, 3, and the region of the second level 72 labelled with address offset t1 corresponds to the four regions labelled with address offsets 4, 5, 6, 7. A similar correspondence exists between the other regions in the first and second levels 71, 72 of the render output 70.

In a similar manner to described for FIG. 5*a*, the pointers for these regions of a group of regions, to the respective primitive lists for these regions, may be stored in a single cache line. The difference, in the arrangement shown in FIG. 9 is that all of the pointers in a group of regions across both the levels 71, 72 of the hierarchy may be stored in the same cache line. Thus, for the first group of regions, the pointers for the regions labelled with address offsets 0, 1, 2, 3, 4, 5, 6, 7, t0, t1 are packed into the same cache line.

It will be appreciated that, e.g. as shown in FIG. 5*b*, when a primitive spans the regions in the first level 71 having memory address offsets 0, 1, 2, 3, it will also span the region in the second level 72 having memory address offset t0. Packing the pointers for the regions labelled with address offsets 0, 1, 2, 3, 4, 5, 6, 7, t0, t1 into the same cache line means that all the pointers required for a primitive spanning these regions (having memory address offsets 0, 1, 2, 3 and t0) will be returned by a single cache line read, which makes for an efficient use of the cache.

Figure 10:
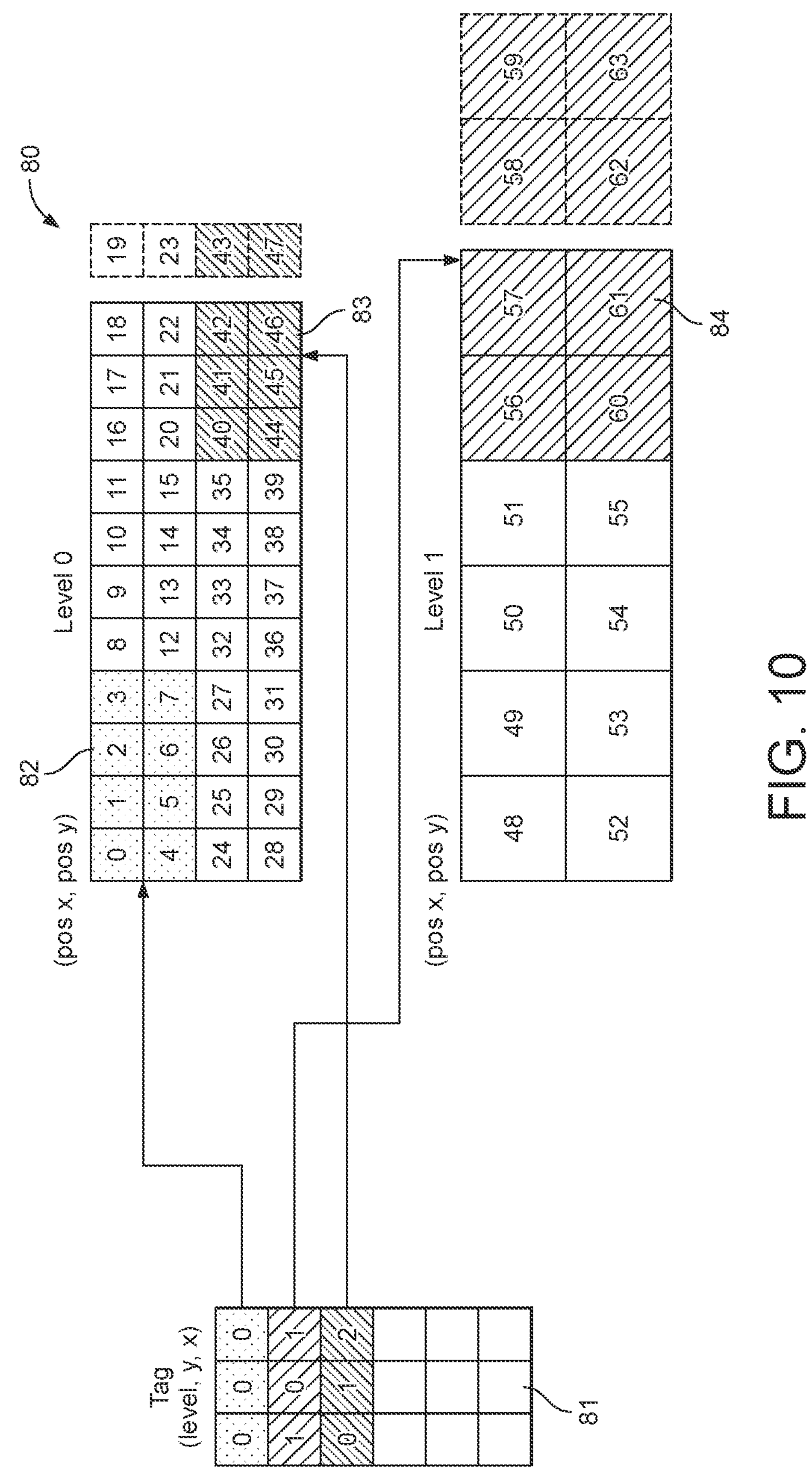
FIG. 10 shows schematically an arrangement of cache tags in a fully associative cache, according to the technology described herein.

FIG. 10 shows schematically an arrangement of cache tags in a fully associative cache, according to an embodiment of the technology described herein. In this arrangement, the cache tags 81 are used to tag groups of pointers for respective groups of regions of the render output 80. Each cache tag comprises the hierarchy level, the y position of the group of regions in the hierarchy level and the x position of the group of regions in the hierarchy level.

As shown in FIG. 10, three groups of regions are illustrated with their respective cache tags. The group of regions 82 at the top left position in level 0 of the render output 80 has the cache tag (0, 0, 0) for the associated group of pointers (because the group of regions 82 is in level 0, in the first available set of rows and the first available set of columns).

The group of regions 83 at the right hand side of the third and fourth rows in level 0 of the render output 80 has the cache tag (0, 1, 2) for the associated group of pointers (because the group of regions 83 is in level 0, in the second available set of rows and the third available set of columns).

The group of regions 84 at the right hand side in level 1 of the render output 80 has the cache tag (1, 0, 1) for the associated group of pointers (because the group of regions 84 is in level 1, in the first available set of rows and the second available set of columns).

It will be seen in FIG. 10 that the render output 80, in both levels of the hierarchy, does not have a width (number of columns) that is an integer multiple of the number of columns in each groups of regions in that level. Thus, at the right hand side of the render output 80, the groups of regions 83, 84 (while still being assigned a memory address) spill over. This prevents any group of regions wrapping round from one set of rows to the next, thus splitting the group and leading to regions that are not contiguous in a group. Thus, for each new set of rows of the render output 80, the group of regions that starts at the left hand side of the render output 80 is a new group.

Figure 11:
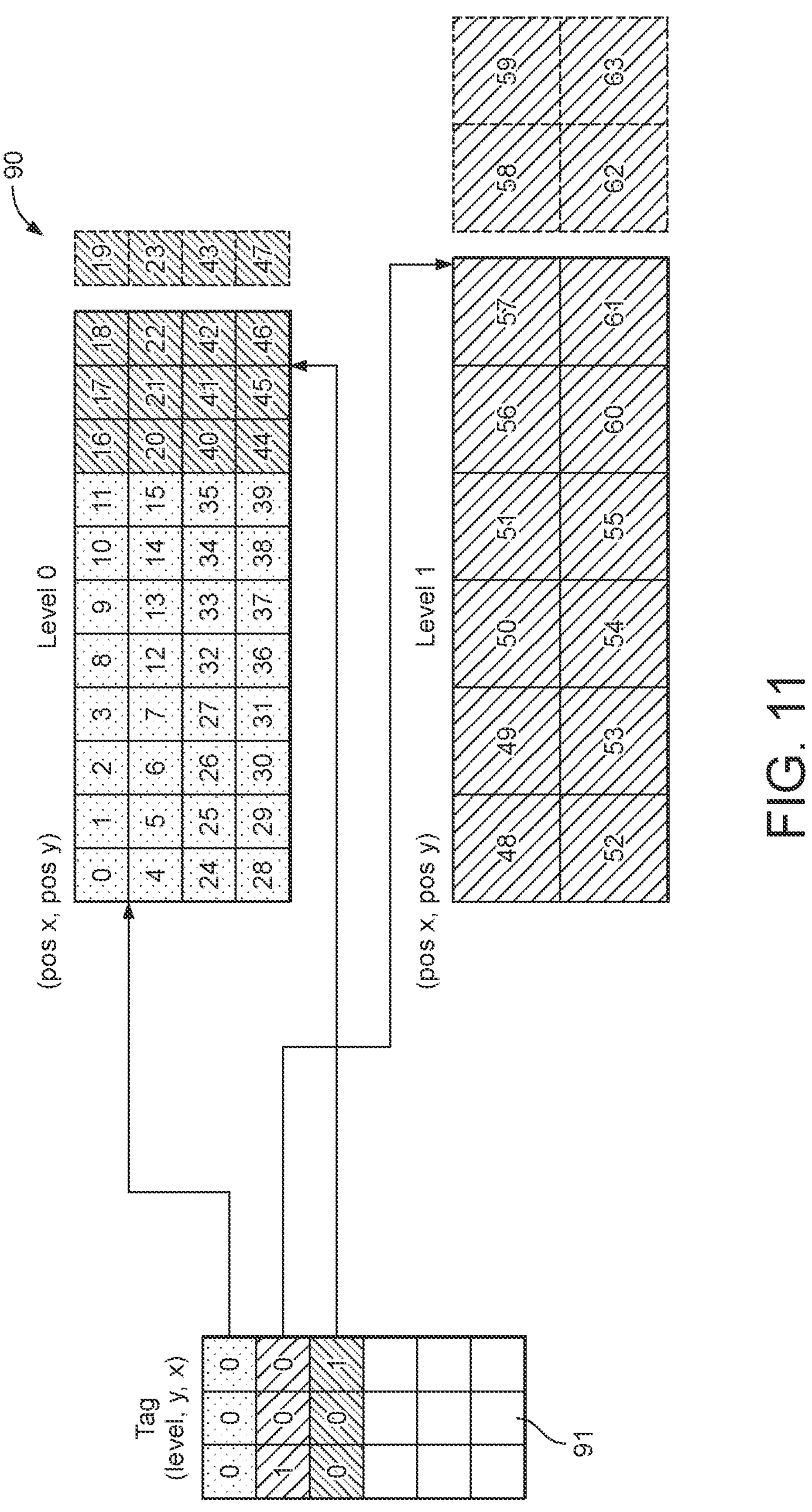
FIG. 11 shows schematically an arrangement of cache tags, according to the technology described herein.

FIG. 11 shows schematically an arrangement of cache tags, according to an embodiment of the technology described herein. The arrangement shown in FIG. 11 is similar to the arrangement shown in FIG. 10, in that the cache tags 91 are used to tag groups of pointers for respective groups of regions of the render output 90. Each cache tag comprises the hierarchy level, the y position of the group of regions in the hierarchy level and the x position of the group of regions in the hierarchy level.

The arrangement of FIG. 11 differs from that of FIG. 10 in that more bits are dropped from the x and y positions, which allows for four rows and eight columns of regions to be covered by each tag. The dropped bits may then be used as an index to select the correct part of the data within the pointers for a group of regions.

Figure 12:
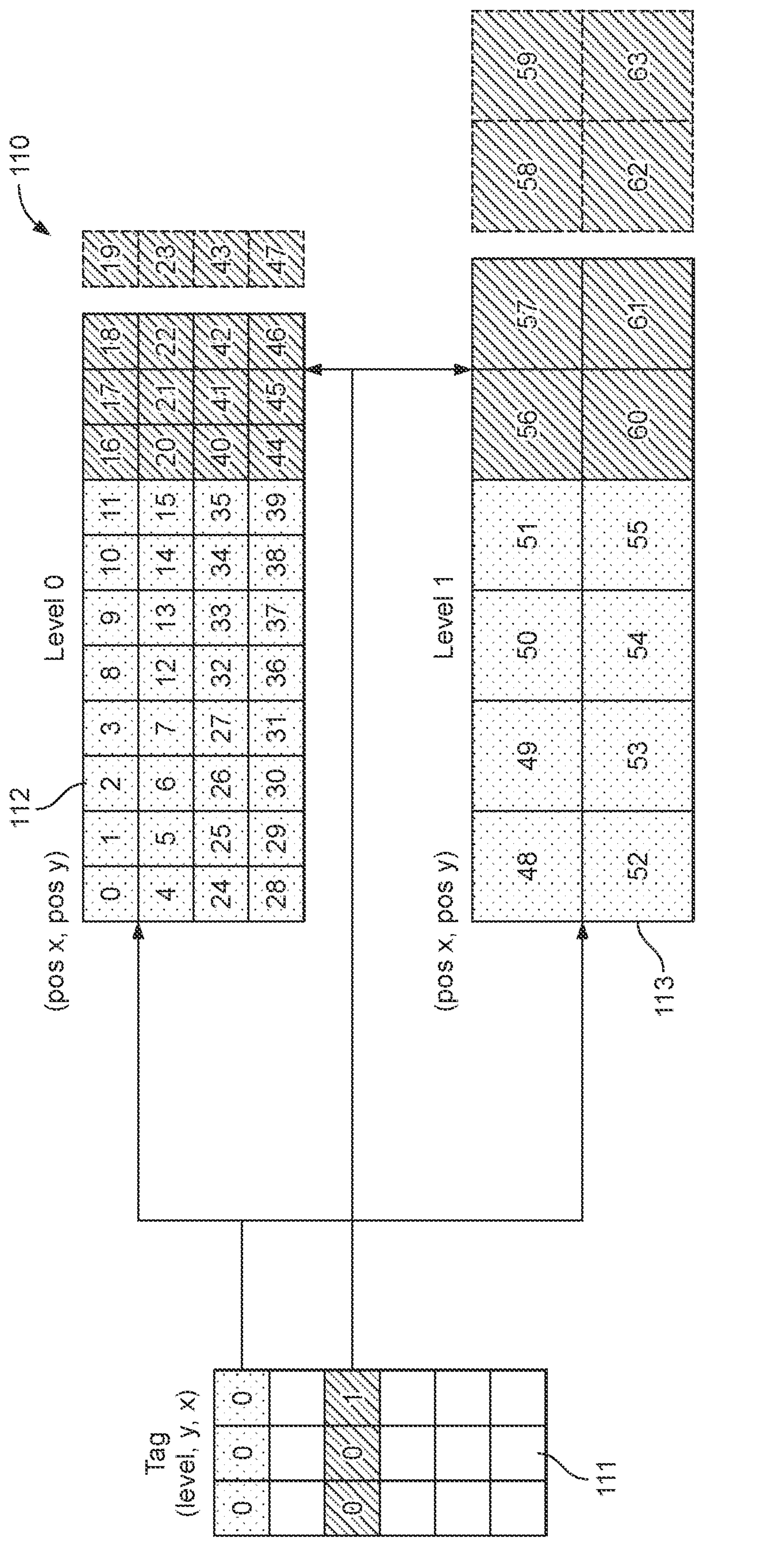
FIG. 12 shows schematically an arrangement of cache tags, according to the technology described herein.

FIG. 12 shows schematically an arrangement of cache tags, according to an embodiment of the technology described herein. The arrangement shown in FIG. 12 is similar to the arrangement shown in FIG. 11, in that the cache tags 111 are used to tag groups of pointers for respective groups of regions of the render output 110. Each cache tag comprises the hierarchy level, the y position of the group of regions in the hierarchy level and the x position of the group of regions in the hierarchy level.

The arrangement of FIG. 12 differs from that of FIG. 11 in that instead of using one tag for a group of regions in level 0 and a separate tag for a group of regions in level 1, a single tag for the groups of regions in levels 0 and 1 is used, taking advantage of the locality of the groups of regions in the two levels (i.e. the group of regions 113 in level 1 corresponds to the same area of the render output 110 as the group of regions 112 in level 0).

Figure 13:
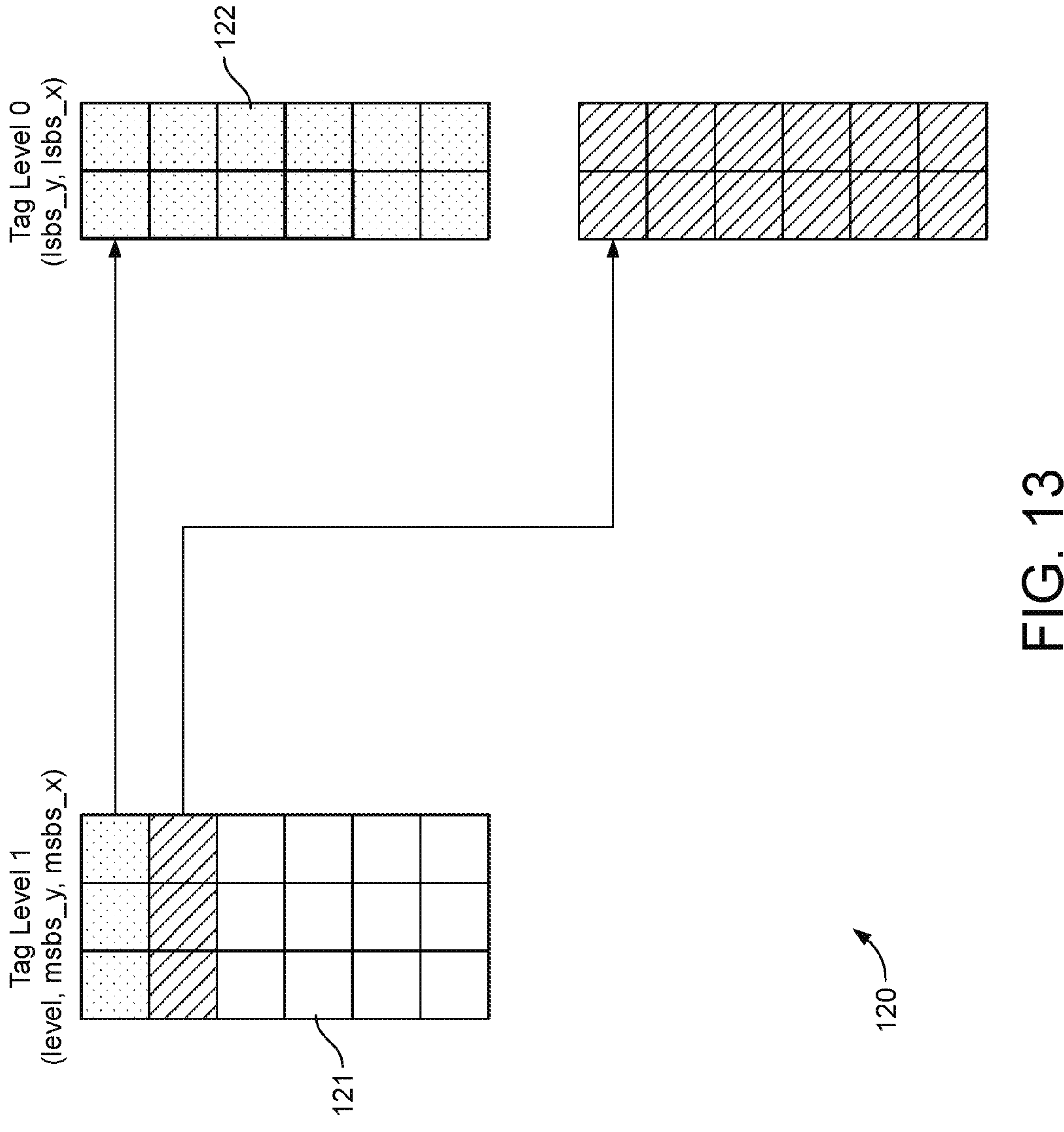
FIG. 13 shows the cache tags for a set-associative cache, according to the technology described herein.

FIG. 13 shows the cache tags for a set-associative cache, according to an embodiment of the technology described herein. In this embodiment, the array of cache tags may be split into a two-level array 120.

In a (e.g. smaller) higher level (level 1) array 121, each cache tag comprises the hierarchy level, the top bits of the y position of the group of regions in the hierarchy level and the top bits of the x position of the group of regions in the hierarchy level. In a (e.g. larger) lower level (level 0) array 122, the bottom bits of the y positions and the bottom bits of the x position of the regions are stored as cache tags. The two-level array 120 is arranged such that there is a lower level array 122 for each entry in the higher level array 121.

In a draw call of primitives to be processed for a render output, it may often be the case that the primitives are located close to each other, e.g. in the same group of regions. The two-level cache array 120 shown in FIG. 13 may therefore facilitate efficient use of the cache, e.g. as all the cache tags for pointers to the required primitive lists for a draw call may be located in the same lower level array 122.

FIG. 14 shows an arrangement of primitive list pointers according to an embodiment of the technology described herein.

The arrangement of the render output 130 shown in FIG. 14 is similar to the arrangement shown in FIGS. **5*a* and 7**, for example. The groups of regions (each containing eight regions) are arranged such that they each span four rows and two columns, and the groups are prevented from wrapping round between rows.

The memory address offset of the regions in each group is arranged such that the memory address offset increments first down the first column and then down the second column. Thus, in FIG. 14, the first column of the first group has address offsets 0, 1, 2, 3 and the second column of the second group has address offsets 4, 5, 6, 7.

The second group of regions has memory address offsets 8, 9, 10, 11 in the first column and 12, 13, 14, 15 in the second column. The same pattern of memory address offsets is repeated for each group of regions in the first four rows of the render output 130.

As in FIG. 10, it will be seen that the render output 130 does not have a width (number of columns) that is an integer multiple of the number of columns in each groups of regions. Thus, at the right hand side of the render output 130, the group of regions 131 (while still being assigned a memory address) spill over. Again, as in FIG. 10, for each new set of rows of the render output 130, the group of regions that starts at the left hand side of the render output 130 is a new group.

FIG. 15 shows an arrangement of primitive list pointers according to an embodiment of the technology described herein.

The arrangement of the render output 140 shown in FIG. 15 is similar to the arrangement shown in FIG. 14, for example. The groups of regions (each containing eight regions) are arranged such that they each span four rows and two columns, and the groups are prevented from wrapping round between rows.

The memory address offset of the regions in each group is arranged such that the memory address offset increments across the rows of each group, thus producing a different layout of the memory address offsets.

Again, as in FIG. 14, the render output 140 does not have a width (number of columns) that is an integer multiple of the number of columns in each groups of regions, so at the right hand side of the render output 140, the group of regions 141 spill over.

Figure 16:
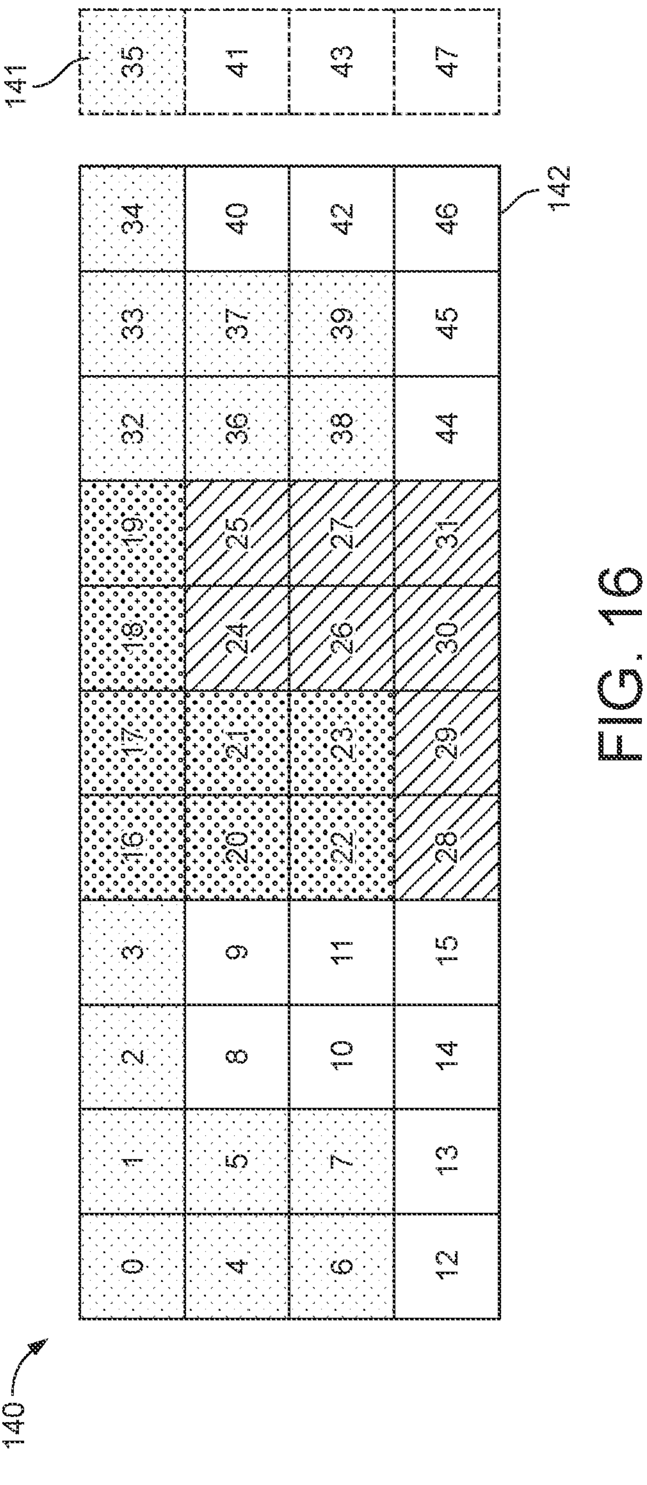

FIG. 16 shows an arrangement of primitive list pointers according to an embodiment of the technology described herein.

The arrangement of the render output 150 shown in FIG. 16 is similar to the arrangements shown in FIGS. 14 and 15, for example. In FIG. 16, however, the groups of regions (each containing eight regions) are arranged into non-rectangular shapes that repeat and tessellate.

Within each region, the memory address offset of the regions in each group is arranged such that the memory address offset increments across the rows of each group.

As in FIGS. 14 and 15, the render output 150 does not have a width (number of columns) that is an integer multiple of the number of columns in each groups of regions, so at the right hand side of the render output 150, the groups of regions 151, 152 spill over.

As will be appreciated from the above, the technology described herein, in at least some embodiments, may enable a more efficient use of the memory and cache in a tile-based graphics processing system. This is achieved, in the embodiments of the technology described herein at least, by allocating neighbouring (e.g. consecutive) memory addresses to the pointers in a group of pointers (that correspond to a group of regions), which helps to locate the pointers close together in memory, such that when primitive lists for neighbouring regions of the render output are required to be fetched, the pointers required are likely to be close together in the memory.

The foregoing detailed description has been presented for the purposes of illustration and description. It is not intended to be exhaustive or to limit the technology described herein to the precise form disclosed. Many modifications and variations are possible in light of the above teaching. The described embodiments were chosen in order to best explain the principles of the technology, and its practical application, to thereby enable others skilled in the art to best utilise the technology, in various embodiments and with various modifications as are suited to the particular use contemplated. It is intended that the scope be defined by the claims appended hereto.

What is claimed is:

1. A method of processing data in a graphics processing system in which a render output is sub-divided into a plurality of tiles for rendering, the method comprising:

determining which primitives in a sequence of primitives to be processed for the render output are to be rendered for respective regions into which the render output is sub-divided for sorting the primitives, wherein the regions form a plurality of rows and columns of regions;

preparing corresponding primitive lists for respective regions of the render output, each primitive list identifying a respective list of primitives that are to be rendered for the region of the render output to which the primitive list relates;

storing the primitive lists in a first region of a memory system of the graphics processing system;

for each of one or more groups of pointers, each group of pointers comprising a plurality of pointers that point to respective primitive lists:

storing the group of pointers in a second region of the memory system;

wherein the regions of the render output corresponding to the primitive lists that are pointed to by the pointers of the group of pointers comprise adjacent regions spanning a plurality of rows and a plurality of columns of regions.

2. The method as claimed in claim 1, wherein the method comprises:

for each of a plurality of groups of pointers, each group of pointers comprising a plurality of pointers that point to respective primitive lists:

storing the group of pointers in a second region of the memory system;

wherein the regions of the render output corresponding to the primitive lists that are pointed to by the pointers of the group of pointers comprise adjacent regions spanning a plurality of rows and a plurality of columns of regions; and wherein the plurality of groups of regions of the render output corresponding to the plurality of groups of pointers tessellate with each other over the render output.

3. The method as claimed in claim 1, wherein each group of the groups of regions forms a contiguous block of regions in the render output.

4. The method as claimed in claim 1, wherein each of the groups of regions is arranged such that the regions of a group of regions do not extend from the end of one row or rows of regions to the beginning of another row or rows of regions.

5. The method as claimed in claim 1, wherein the method comprises:

for each of the one or more groups of pointers:

storing the group of pointers in a block of data in the second region of the memory system;

wherein the block of data corresponds to a single memory read.

6. The method as claimed in claim 1, wherein the method comprises:

sub-dividing the render output into a plurality of regions each of a first size for sorting the primitives; and sub-dividing the render output into a plurality of regions each of a second size for sorting the primitives;

wherein the plurality of regions of a second size each correspond to a plurality of the regions of a first size.

7. The method as claimed in claim 1, wherein the method comprises:

for each of the one or more groups of pointers:

wherein the regions of the render output corresponding to the primitive lists that are pointed to by the pointers of the group of pointers comprise:

a plurality of adjacent regions of a first size spanning a plurality of rows and a plurality of columns of regions; and one or more regions of a second size each corresponding to a set of plural adjacent regions of the plurality of adjacent regions of a first size.

8. The method as claimed in claim 1, wherein the method comprises:

for each of the one or more groups of pointers:

storing further data fields with the group of pointers in the second region of the memory system.

9. The method as claimed in claim 1, wherein the memory system comprises a cache system and the second region comprises a region of the cache system;

wherein the method comprises:

for each of the one or more groups of pointers:

storing a cache tag in the memory system for the group of pointers.

10. The method as claimed in claim 9, wherein the cache tag comprises an indication of the position of the regions in the group of regions corresponding to the group of pointers.

11. A graphics processing system in which a render output is sub-divided into a plurality of tiles for rendering, the graphics processing system comprising:

a memory system;

a tiling circuit that is operable to perform tiling operations to determine which primitives in a sequence of primitives to be processed for the render output are to be rendered for respective regions into which the render output is sub-divided for sorting the primitives, wherein the regions form a plurality of rows and columns of regions; and a primitive list preparation circuit that is operable to:

prepare corresponding primitive lists for respective regions of the render output, each primitive list identifying a respective list of primitives that are to be rendered for the region of the render output to which the primitive list relates;

store the primitive lists in a first region of a memory system of the graphics processing system; and for each of one or more groups of pointers, each group of pointers comprising a plurality of pointers that point to respective primitive lists:

store the group of pointers in a second region of the memory system;

wherein the regions of the render output corresponding to the primitive lists that are pointed to by the pointers of the group of pointers comprise adjacent regions spanning a plurality of rows and a plurality of columns of regions.

12. The graphics processing system as claimed in claim 11, wherein the primitive list preparation circuit is operable to:

for each of a plurality of groups of pointers, each group of pointers comprising a plurality of pointers that point to respective primitive lists:

store the group of pointers in a second region of the memory system;

wherein the regions of the render output corresponding to the primitive lists that are pointed to by the pointers of the group of pointers comprise adjacent regions spanning a plurality of rows and a plurality of columns of regions; and wherein the plurality of groups of regions of the render output corresponding to the plurality of groups of pointers tessellate with each other over the render output.

13. The graphics processing system as claimed in claim 11, wherein each group of the groups of regions forms a contiguous block of regions in the render output.

14. The graphics processing system as claimed in claim 11, wherein each of the groups of regions is arranged such that the regions of a group of regions do not extend from the end of one row or rows of regions to the beginning of another row or rows of regions.

15. The graphics processing system as claimed in claim 11, wherein the primitive list preparation circuit is operable to:

for each of the one or more groups of pointers:

store the group of pointers in a block of data in the second region of the memory system;

wherein the block of data corresponds to a single memory read.

16. The graphics processing system as claimed in claim 11, wherein the tiling circuit is operable to:

sub-divide the render output into a plurality of regions each of a first size for sorting the primitives; and sub-divide the render output into a plurality of regions each of a second size for sorting the primitives;

wherein the plurality of regions of a second size each correspond to a plurality of the regions of a first size.

17. The graphics processing system as claimed in claim 11, wherein the primitive list preparation circuit is operable to:

for each of the one or more groups of pointers:

wherein the regions of the render output corresponding to the primitive lists that are pointed to by the pointers of the group of pointers comprise:

a plurality of adjacent regions of a first size spanning a plurality of rows and a plurality of columns of regions; and one or more regions of a second size each corresponding to a set of plural adjacent regions of the plurality of adjacent regions of a first size.

18. The graphics processing system as claimed in claim 11, wherein the primitive list preparation circuit is operable to:

for each of the one or more groups of pointers:

store further data fields with the group of pointers in the second region of the memory system.

19. The graphics processing system as claimed in claim 11, wherein the memory system comprises a cache system and the second region comprises a region of the cache system;

wherein the primitive list preparation circuit is operable to:

for each of the one or more groups of pointers:

store a cache tag in the memory system for the group of pointers;

wherein the cache tag comprises an indication of the position of the regions in the group of regions corresponding to the group of pointers.

20. A non-transitory computer readable storage medium storing computer software code which when executing on a graphics processor performs a method of operating a graphics processing system in which a render output is sub-divided into a plurality of tiles for rendering, the method comprising:

determining which primitives in a sequence of primitives to be processed for the render output are to be rendered for respective regions into which the render output is sub-divided for sorting the primitives, wherein the regions form a plurality of rows and columns of regions;

preparing corresponding primitive lists for respective regions of the render output, each primitive list identifying a respective list of primitives that are to be rendered for the region of the render output to which the primitive list relates;

storing the primitive lists in a first region of a memory system of the graphics processing system;

for each of one or more groups of pointers, each group of pointers comprising a plurality of pointers that point to respective primitive lists:

storing the group of pointers in a second region of the memory system;

wherein the regions of the render output corresponding to the primitive lists that are pointed to by the pointers of the group of pointers comprise adjacent regions spanning a plurality of rows and a plurality of columns of regions.

* * * * *